US007240280B2

(12) United States Patent
Jolley et al.

(10) Patent No.: US 7,240,280 B2
(45) Date of Patent: Jul. 3, 2007

(54) SYSTEM AND METHOD FOR APPLICATION FLOW INTEGRATION IN A PORTAL FRAMEWORK

(75) Inventors: Chris Jolley, Broomfield, CO (US); Sathyanarayana Giridhar, Redmond, WA (US); Philip B. Griffin, Longmont, CO (US); Jason Howes, Cambridge, MA (US); Edward K. O'Neil, Boulder, CO (US); Jalpesh Patadia, Boulder, CO (US)

(73) Assignee: Bea Systems, Inc., San Jose, CA (US)

( * ) Notice: Subject to any disclaimer, the term of this patent is extended or adjusted under 35 U.S.C. 154(b) by 778 days.

(21) Appl. No.: 10/279,951

(22) Filed: Oct. 24, 2002

(65) Prior Publication Data

US 2003/0149722 A1     Aug. 7, 2003

Related U.S. Application Data

(60) Provisional application No. 60/386,487, filed on Oct. 24, 2001.

(51) Int. Cl.
   *G06F 17/21* (2006.01)
(52) U.S. Cl. ...................................... 715/513
(58) Field of Classification Search .................. 715/513
   See application file for complete search history.

(56) References Cited

U.S. PATENT DOCUMENTS 5,173,939 A    12/1992  Abadi et al.
5,237,614 A    8/1993   Weiss
5,347,653 A    9/1994   Flynn et al.
5,355,474 A    10/1994  Thuraisngham et al.
5,369,702 A    11/1994  Shanton ........................ 380/4
5,426,747 A    6/1995   Weinreb et al.
5,481,700 A    1/1996   Thuraisingham ............ 395/600
5,544,322 A    8/1996   Cheng et al.
5,627,886 A    5/1997   Bowman ..................... 379/111
5,649,195 A    7/1997   Scott et al. ................. 395/617

(Continued)

FOREIGN PATENT DOCUMENTS

EP          1 256 889 A       11/2002

(Continued)

OTHER PUBLICATIONS

Nusbaum, et al., "WebSphere Application Servers: Standard and Advanced Editions," IBM Corporation, IBM Redbooks, First Edition, Jul. 1999, cover and copyright pages and pp. 1-28 and 91-119.*

(Continued)

*Primary Examiner*—Doug Hutton
(74) *Attorney, Agent, or Firm*—Fliesler Meyer LLP

(57) ABSTRACT

A system and a method for providing application flow integration in a portal framework. In accordance with one embodiment, the invention comprises a portal servlet, which handles all incoming servlet requests and determines whether the incoming request represents a request either for a portal page or for a non-portal page; and, a portal processor which handles all portal page requests passed by the portal servlet, and executes an appropriate webflow to update the current state of the portal page, depending on a current set of events. Each of a plurality of portlets may have an individual webflow associated with it.

16 Claims, 20 Drawing Sheets

U.S. PATENT DOCUMENTS

| | | | |
|---|---|---|---|
| 5,758,355 A | 5/1998 | Buchanan | 707/201 |
| 5,797,128 A | 8/1998 | Birnbaum | 707/5 |
| 5,826,000 A | 10/1998 | Hamilton | |
| 5,826,268 A | 10/1998 | Schaefer et al. | 707/9 |
| 5,838,909 A | 11/1998 | Roy et al. | 395/200.39 |
| 5,848,396 A | 12/1998 | Gerace | 705/10 |
| 5,867,667 A | 2/1999 | Butman et al. | |
| 5,918,210 A | 6/1999 | Rosenthal et al. | |
| 5,950,195 A | 9/1999 | Stockwell et al. | |
| 5,956,400 A | 9/1999 | Chaum et al. | |
| 5,956,719 A | 9/1999 | Kudo et al. | 707/10 |
| 5,966,707 A | 10/1999 | Van Huben et al. | |
| 5,987,611 A | 11/1999 | Freund | |
| 5,991,735 A | 11/1999 | Gerace | 705/10 |
| 5,991,877 A | 11/1999 | Luckenbaugh | 713/200 |
| 6,005,571 A | 12/1999 | Pachauri | 345/339 |
| 6,006,194 A | 12/1999 | Merel | |
| 6,006,285 A | 12/1999 | Jacobs et al. | 710/14 |
| 6,009,410 A | 12/1999 | LeMole et al. | 705/14 |
| 6,026,433 A | 2/2000 | D'Arlach et al. | 709/217 |
| 6,029,144 A | 2/2000 | Barrett et al. | |
| 6,029,182 A | 2/2000 | Nehab et al. | 707/523 |
| 6,055,637 A | 4/2000 | Hudson et al. | 713/201 |
| 6,058,392 A | 5/2000 | Sampson et al. | |
| 6,081,829 A | 6/2000 | Sidana | 709/203 |
| 6,083,276 A | 7/2000 | Davidson et al. | 717/1 |
| 6,092,083 A | 7/2000 | Brodersen et al. | 707/201 |
| 6,098,173 A | 8/2000 | Elgressy et al. | |
| 6,105,027 A | 8/2000 | Schneider et al. | 707/9 |
| 6,112,192 A | 8/2000 | Capek | 705/59 |
| 6,128,663 A | 10/2000 | Thomas | 709/228 |
| 6,133,915 A | 10/2000 | Arcuri et al. | 345/334 |
| 6,141,010 A | 10/2000 | Hoyle | 345/356 |
| 6,141,686 A | 10/2000 | Jackowski et al. | |
| 6,144,988 A * | 11/2000 | Kappel | 709/202 |
| 6,148,333 A | 11/2000 | Guedalia et al. | |
| 6,154,844 A | 11/2000 | Touboul et al. | |
| 6,157,924 A | 12/2000 | Austin | 707/10 |
| 6,161,139 A | 12/2000 | Win et al. | 709/225 |
| 6,167,448 A | 12/2000 | Hemphill et al. | 709/224 |
| 6,169,794 B1 | 1/2001 | Oshimi et al. | 379/207 |
| 6,170,009 B1 | 1/2001 | Mandal et al. | |
| 6,178,172 B1 | 1/2001 | Rochberger | 370/395 |
| 6,182,142 B1 | 1/2001 | Win et al. | 709/229 |
| 6,182,226 B1 | 1/2001 | Reid et al. | 713/201 |
| 6,182,277 B1 | 1/2001 | DeGroot et al. | |
| 6,188,399 B1 | 2/2001 | Voas et al. | 345/334 |
| 6,195,696 B1 | 2/2001 | Baber et al. | 709/223 |
| 6,202,066 B1 | 3/2001 | Barkley et al. | 707/9 |
| 6,202,157 B1 | 3/2001 | Brownlie et al. | |
| 6,205,466 B1 | 3/2001 | Karp et al. | 709/104 |
| 6,209,101 B1 | 3/2001 | Mitchem et al. | |
| 6,216,231 B1 | 4/2001 | Stubblebine | |
| 6,226,745 B1 | 5/2001 | Wiederhold | 713/200 |
| 6,233,576 B1 | 5/2001 | Lewis | 707/9 |
| 6,236,991 B1 | 5/2001 | Frauenhofer et al. | 707/6 |
| 6,241,608 B1 | 6/2001 | Torango | 463/27 |
| 6,253,321 B1 | 6/2001 | Nikander et al. | |
| 6,260,050 B1 | 7/2001 | Yost et al. | 707/501 |
| 6,269,393 B1 | 7/2001 | Yost et al. | 709/201 |
| 6,275,941 B1 | 8/2001 | Saito et al. | |
| 6,285,983 B1 | 9/2001 | Jenkins | 705/10 |
| 6,285,985 B1 | 9/2001 | Horstmann | 705/14 |
| 6,295,607 B1 | 9/2001 | Johnson | |
| 6,308,163 B1 | 10/2001 | Du et al. | 705/8 |
| 6,317,868 B1 | 11/2001 | Grimm et al. | |
| 6,327,628 B1 | 12/2001 | Anuff et al. | 709/311 |
| 6,336,073 B1 | 1/2002 | Ihara et al. | 701/202 |
| 6,341,352 B1 | 1/2002 | Child et al. | |
| 6,353,886 B1 | 3/2002 | Howard et al. | |
| 6,393,474 B1 | 5/2002 | Eichert et al. | |
| 6,412,077 B1 | 6/2002 | Roden et al. | |
| 6,418,448 B1 | 7/2002 | Sarkar | |
| 6,438,563 B1 | 8/2002 | Kawagoe | 707/201 |
| 6,449,638 B1 | 9/2002 | Wecker et al. | 709/217 |
| 6,457,007 B1 | 9/2002 | Kikuchi et al. | |
| 6,460,084 B1 | 10/2002 | Van Horne et al. | 709/227 |
| 6,460,141 B1 | 10/2002 | Olden | 713/201 |
| 6,463,440 B1 | 10/2002 | Hind et al. | 707/102 |
| 6,473,791 B1 | 10/2002 | Al-Ghosein et al. | |
| 6,477,575 B1 | 11/2002 | Koeppel et al. | |
| 6,484,177 B1 | 11/2002 | Van Huben et al. | |
| 6,484,261 B1 | 11/2002 | Wiegel | |
| 6,519,647 B1 | 2/2003 | Howard et al. | |
| 6,530,024 B1 | 3/2003 | Proctor | |
| 6,539,375 B2 | 3/2003 | Kawasaki | 707/5 |
| 6,571,247 B1 | 5/2003 | Danno et al. | 707/100 |
| 6,584,454 B1 | 6/2003 | Hummel et al. | |
| 6,587,849 B1 | 7/2003 | Mason et al. | 707/5 |
| 6,615,218 B2 | 9/2003 | Mandal et al. | |
| 6,618,806 B1 | 9/2003 | Brown et al. | |
| 6,654,747 B1 | 11/2003 | Van Huben et al. | |
| 6,665,677 B1 | 12/2003 | Wotring et al. | |
| 6,668,354 B1 | 12/2003 | Chen et al. | 715/517 |
| 6,721,888 B1 | 4/2004 | Liu et al. | |
| 6,735,586 B2 | 5/2004 | Timmons | 707/3 |
| 6,735,701 B1 | 5/2004 | Jacobson | |
| 6,751,659 B1 | 6/2004 | Fenger et al. | |
| 6,754,672 B1 | 6/2004 | McLauchlin | 707/104 |
| 6,769,118 B2 | 7/2004 | Garrison et al. | |
| 6,789,202 B1 | 9/2004 | Ko et al. | |
| 6,880,005 B1 | 4/2005 | Bell et al. | |
| 6,904,454 B2 | 6/2005 | Stickler | |
| 6,920,457 B2 | 7/2005 | Pressmar | |
| 6,957,261 B2 | 10/2005 | Lortz | |
| 6,965,999 B2 | 11/2005 | Fox et al. | |
| 6,970,876 B2 | 11/2005 | Hotti et al. | |
| 6,985,939 B2 * | 1/2006 | Fletcher et al. | 709/223 |
| 7,051,084 B1 * | 5/2006 | Hayton et al. | 709/219 |
| 7,062,490 B2 | 6/2006 | Adya et al. | |
| 2001/0009016 A1 | 7/2001 | Hofmann et al. | |
| 2002/0059394 A1 | 5/2002 | Sanders | |
| 2002/0062451 A1 | 5/2002 | Scheidt et al. | |
| 2002/0069261 A1 | 6/2002 | Bellare et al. | |
| 2002/0107913 A1 | 8/2002 | Rivera et al. | |
| 2002/0111998 A1 | 8/2002 | Kim | |
| 2002/0124053 A1 | 9/2002 | Adams et al. | |
| 2002/0173971 A1 | 11/2002 | Stirpe et al. | |
| 2002/0178119 A1 | 11/2002 | Griffin et al. | |
| 2003/0065721 A1 | 4/2003 | Roskind | |
| 2003/0078972 A1 | 4/2003 | Tapissier et al. | |
| 2003/0131113 A1 | 7/2003 | Reeves et al. | |
| 2003/0140308 A1 | 7/2003 | Murthy et al. | |
| 2003/0187956 A1 | 10/2003 | Belt et al. | |
| 2003/0229623 A1 | 12/2003 | Chang et al. | |
| 2004/0003071 A1 | 1/2004 | Mathew et al. | |
| 2004/0019650 A1 | 1/2004 | Auvenshine | |
| 2004/0024812 A1 | 2/2004 | Park et al. | |
| 2004/0205473 A1 | 10/2004 | Fisher et al. | |
| 2004/0205557 A1 | 10/2004 | Bahrs et al. | |
| 2004/0230546 A1 | 11/2004 | Rogers | |
| 2005/0050184 A1 | 3/2005 | Boden et al. | |
| 2005/0060324 A1 | 3/2005 | Johnson et al. | |
| 2006/0085412 A1 | 4/2006 | Johnson et al. | |

FOREIGN PATENT DOCUMENTS

| | | | |
|---|---|---|---|
| WO | WO0038078 A | 6/2000 | |
| WO | WO0114962 A | 3/2001 | |
| WO | WO 01/67285 A | 9/2001 | |
| WO | WO 01/77823 A1 | 10/2001 | |

WO  WO 02/063496 A2  8/2002

OTHER PUBLICATIONS

IBM TDB, "Optimizing and Minimizing Portlet Round Trips to a Portal Server," IBM Technical disclosure, downloaded from ip.com, ip.com number: IPCOM000015059D, original publication date: Sep. 1, 2001.*

Akerley, et al., "Developing an e-business Application for the IBM WebSphere Application Server," IBM, IBM Redbook, Sep. 1999, available online from http://www.rebooks.ibm.com, available online from http://www.rebooks.ibm.com.*

Conzetti, et al., "The Front of IBM WebSphere, Building e-business User Interfaces," IBM, IBM Redbook, Jan. 2000, available online from http://www.rebooks.ibm.com.*

Artus, et al., "WebSphere V3.5 Handbook," IBM, IBM Redbook, Jan. 2001, available online from http://www.rebooks.ibm.com.*

Dumbill, "XML at Jetspeed," XML.com, May 15, 2000.*

Moran, et al., "Multimodal User Interfaces in the Open Agent Architecture", ACM 1997, pp. 61-68.

Rouff, "Formal Specification of User Interfaces", SIGCHI Bulletin, Jul. 1996, vol. 28, No. 3, pp. 27-33.

Sundsted, Todd, "NJDI Overview, Part 1: An Introduction to Naming Services", JavaWorld, Jan. 2000, pp. 1-6 (downloaded from: www.javaworld.com/javaworld/jw-01-2000/jw-01-howto_p.html).

Moore, Bill, et al., "Migrating WebLogic Applications to WebSphere Advanced Edition", IBM Redbooks, Jan. 2001, pp. 1, 3-4, 109-111, and 181-195.

Barrett, Alexandra, "Trying Out Transactions", SunExpert Magazine, Jan. 1999, pp. 57-59.

Ayers, Danny, et al., Professional Java Server Programming, Wrox Press, Ltd., Birmingham, UK, Dec. 1999, pp. 515-545.

Ford, Nigel, Web Developer.com Guide to Building Intelligent Web Sites with JavaScript, Wiley Computer Publishing, New York, NY, © 1998, pp. 65-86, 96-98, 101-102, 245-25- and 324-327.

Microsoft Computer Dictionary, 4th Edition, Microsoft Press, Redmond, WA, © 1999, p. 489.

Eiji Okamoto, "Proposal for Integrated Security System", Jun. 1992, IEEE computer Society Press, pp. 354-358.

http://java.sun.com/products/ejb/ (last visit: Dec. 7, 2004).

http://www.javaworld.com/javaworld/jw-1207-yesnoejb_.html (last visit: Dec. 7, 2004).

Hunter, Jason, "Java Servlet Programming", second edition, O'Reilly, Apr. 11, 2001.

http://java.sun.com/products/ejb/ (last visit: Dec. 7, 2004), J2EE Enterprise Javabgans Technology.

http://www.javaworld.com/javaworld/jw-12-2002/jw-1207-yesnoejb_.html (last visit: Dec. 7, 2004), to EJB, or not to EJB.

Hunter, Jason, "Java Servlet Programming", second edition, O'Reilly, Apr. 11, 2001, Cover Copyright Page pp. 27, 29, 297, 366, 369, 386, 449, 450, 479, 481, 506, 507, 538, 539, 609, 610, and 611, only.

"USDataCenter Chooses Baltimore SelectAccess to Enable Next generation Security Solutions for eBusiness"; Business Wire, P2079, Apr. 4, 2001; Newswire; Trade; pp. 2.

C.W. Symborski, "Updating Software and Configuration Data in a Distributed Communications Network"; Computer Networking Symposium, 1988; pp. 331-338.

European Search Report, dated Oct. 12, 2006 (3 pages).

Adomavicius, Gediminas, et al., "User Profiling in Personalization Applications Through Rule Discovery and Validation", KDD '99, San Diego, CA © ACM 1999, pp. 377-381.

Cingil, Ibrahim, et al., "A Broader Approach to Personalization", Communications of the ACM, vol. 43, No. 6, Aug. 2000, pp. 136-141.

Stephanidis, Constantine, et al., "Decision Making in Intelligent User Interfaces", IUI '97, Orlando, FL © ACM 1997, pp. 195-202.

Stiemerling, Oliver, et al., "How to Make Software Softer—Designing Tailorable Applications", DIS '97, Amsterdam, The Netherlands, © ACM 1997, pp. 365-376.

Zhang, et al., "Designing a Robust Namespace for Distributed File Services", Reliable Distributed Systems, 2001, Proceedings 20th IEEE Symposium on Oct. 28-31, 2001, pp. 162-171.

Adya, et al., "FARSITE: Federated, Available and Reliable Storage for an Incompletely Trusted Environment", ACM SIGOPS Operating Systems Review, vol. 36, Issue SI (Winter 2002), OSD1 '02: Proceedings of the 5th Symposium on Operating Systems Design and Implementation, pp. 1-14.

Freudenthal, et al., "dRBAC: Distributed Role-Based Access Control for Dynamic Coalition Environments", Proceedings of the 22nd International Conference on Distributed Computing Systems (ICDCS '02), IEEE 2002, 10 pages.

Kistler, et al., "WebL—a programming language for the web" Computer Networks and ISDN Systems, North Holland Publishing, Amsterdam, NL,, vol. 30, No. 1-7, Apr. 1998, pp. 259-270.

Levy, "Web Programming in Guide", Software Practice & Experience, Wiley & Sons, Bognor Regis, GB, vol. 28, No. 15, Dec. 25, 1998 pp. 1581-1603.

Atkins, et al., "Mawl: A Domain-Specific Language for Form-Based Services" IEEE Transactions on Software Engineering, IEEE Service Center, Los Alamitos, CA, US, vol. 25, No. 3, May 1999. pp. 334-346.

Howes, "The String Representation of LDAP Search Filters", © The Internet Society, Dec. 1997 (RFC 2254) pp. 1-8.

Catley, et al., "Design of a Health Care Architecture for Medical Data Interoperability and Application Integration", Proceedings of the Second Joint EMBS/BMES Conference, Houston, TX, US, Oct. 23-26, 2002, IEEE, vol. 3, pp. 1952-1953.

Browne, et al., "Location-Independent Naming for Virtual Distributed Software Repositories", http://portal.acm.org/dl.cfm, ACM Symposium on Software Reusability, Seattle, WA, US, Aug. 1995, vol. 20, Issue SI, pp. 179-185.

European Search Report dated Dec. 19, 2006, Application No. EP 01975484.5, 3 pages.

* cited by examiner

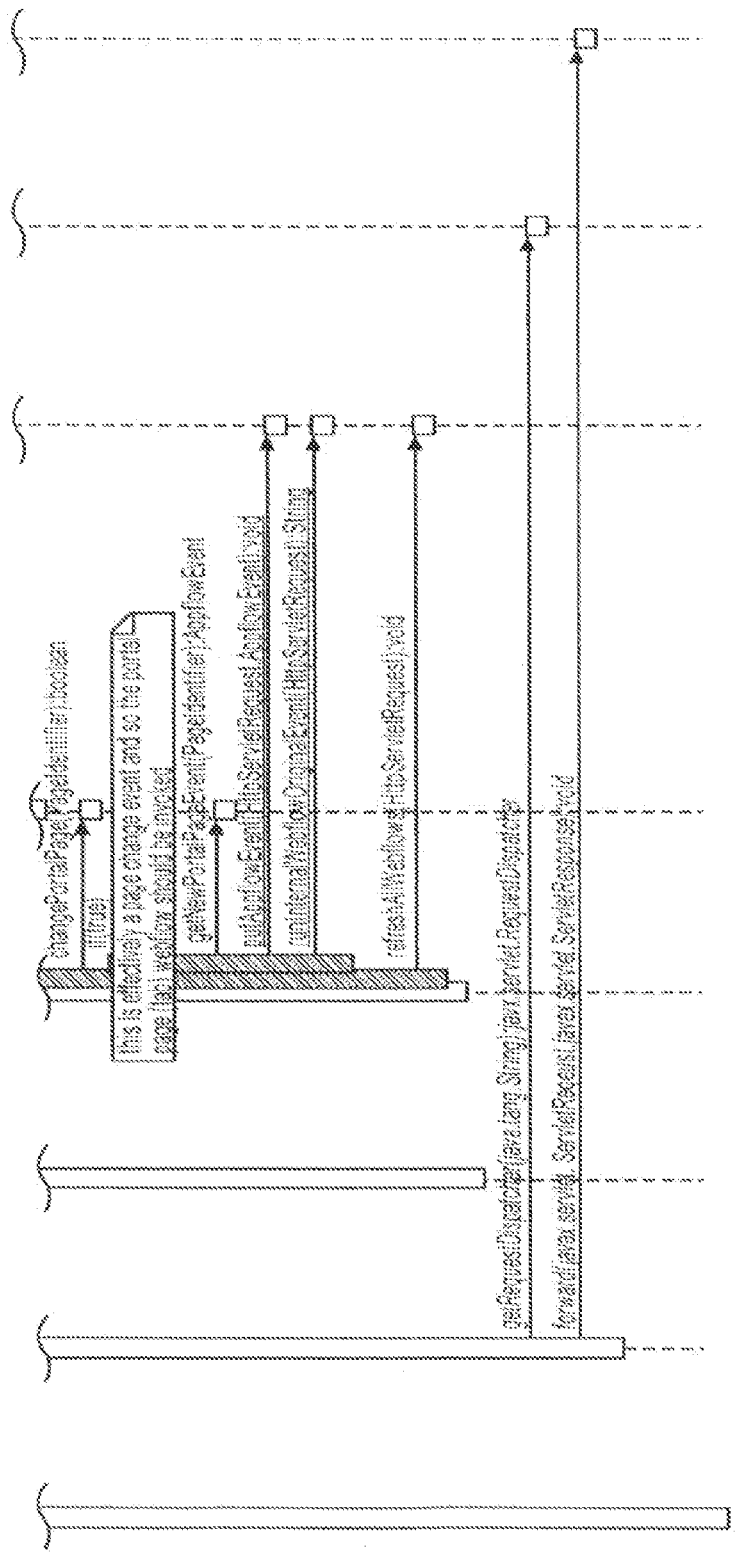

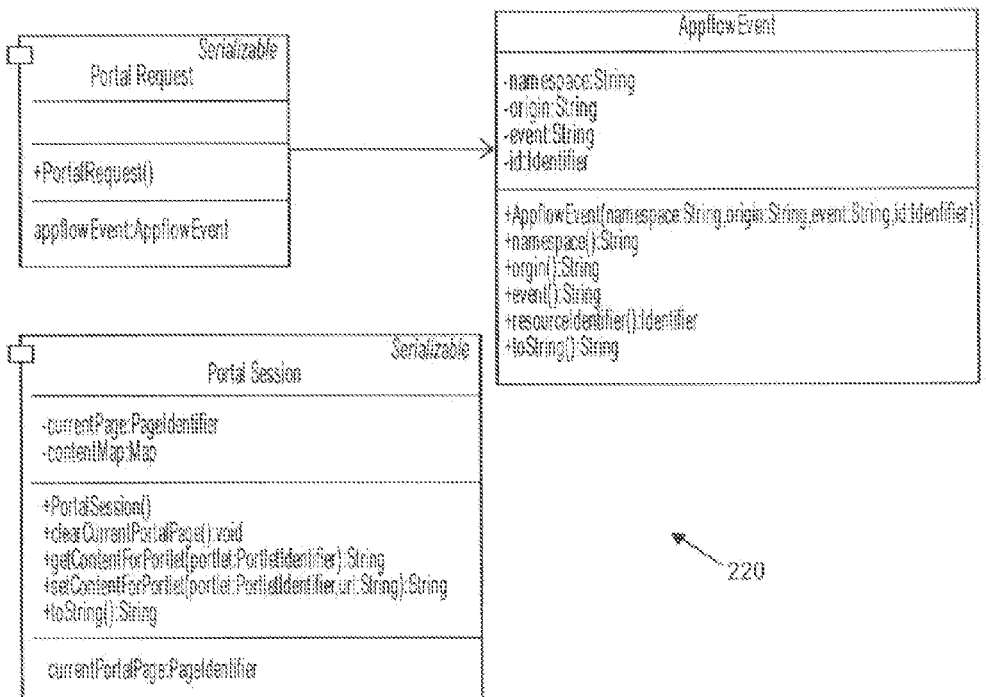
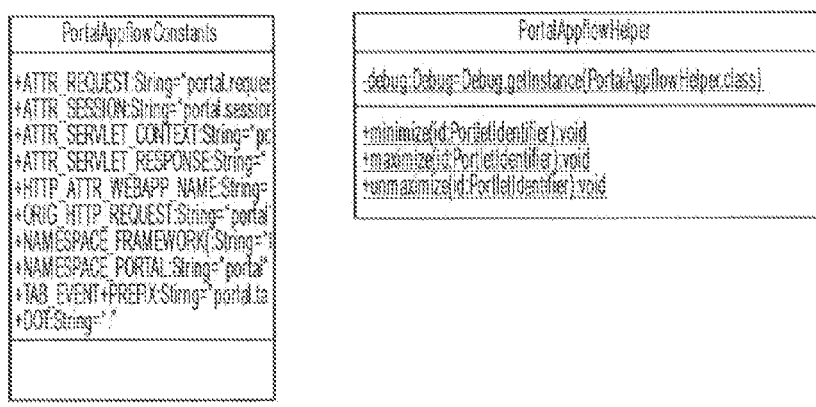
FIG. 12

230

| PortalServlet | HttpServlet |
|---|---|
| -webAppName:String<br>-defaultNamespace:String<br>-frameworkEvent:AppflowEvent<br>-debug:Debug=Debug.getInstance(PortalServlet.class) | |
| +PortalServlet()<br>+init(config:ServletConfig):void<br>+doGet(request:HttpServletRequest,response:HttpServletResponse):void<br>+doPost(request:HttpServletRequest,response:HttpServletResponse):void<br>-invokePortalWebflow(context:ServletContext,request:HttpServletRequest,response:HttpServletResponse):String<br>-invokeNonPortalWebflow(context:ServletContext,request:HttpServletRequest,response:HttpServletResponse):String | |

FIG. 13

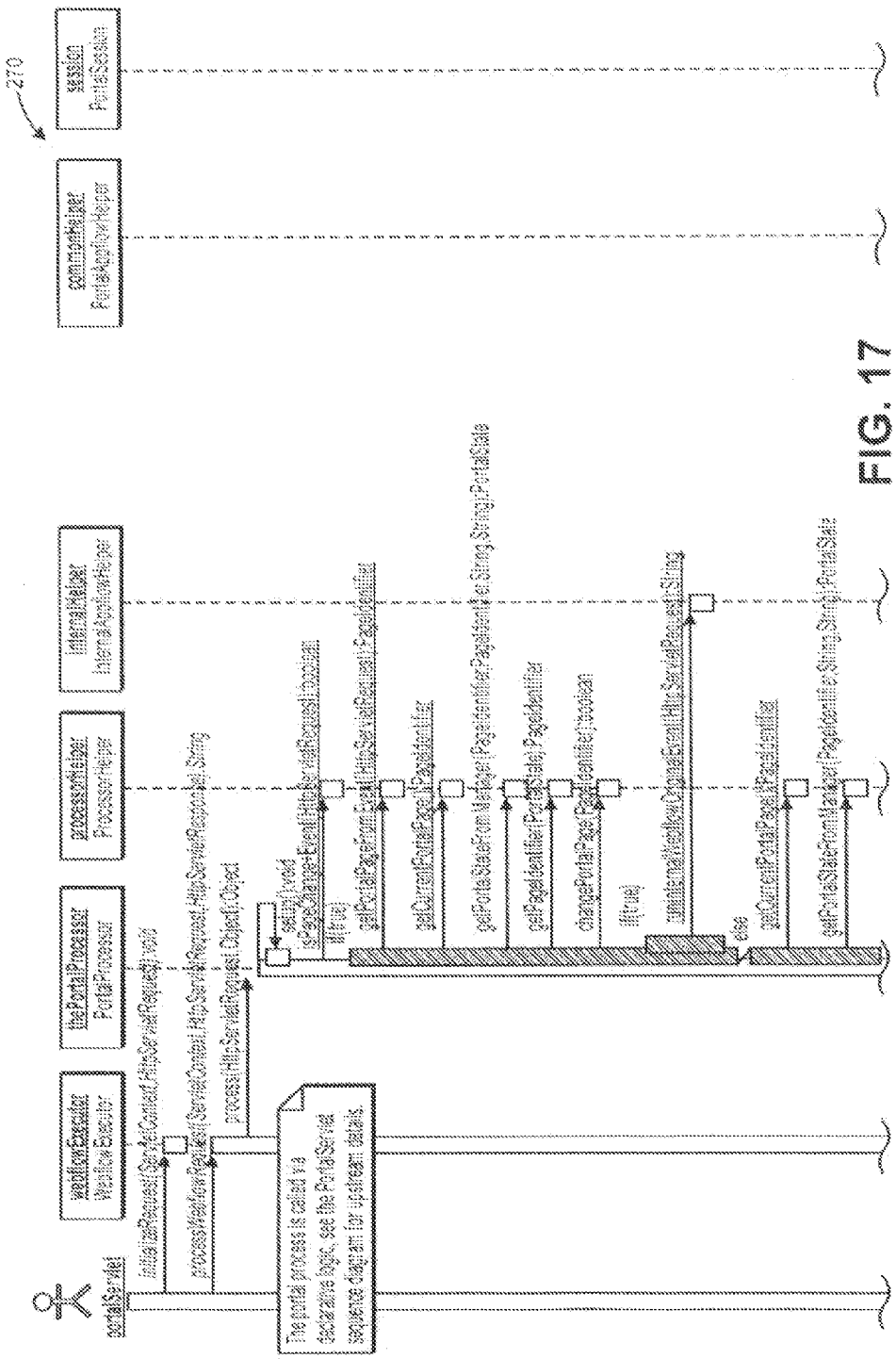

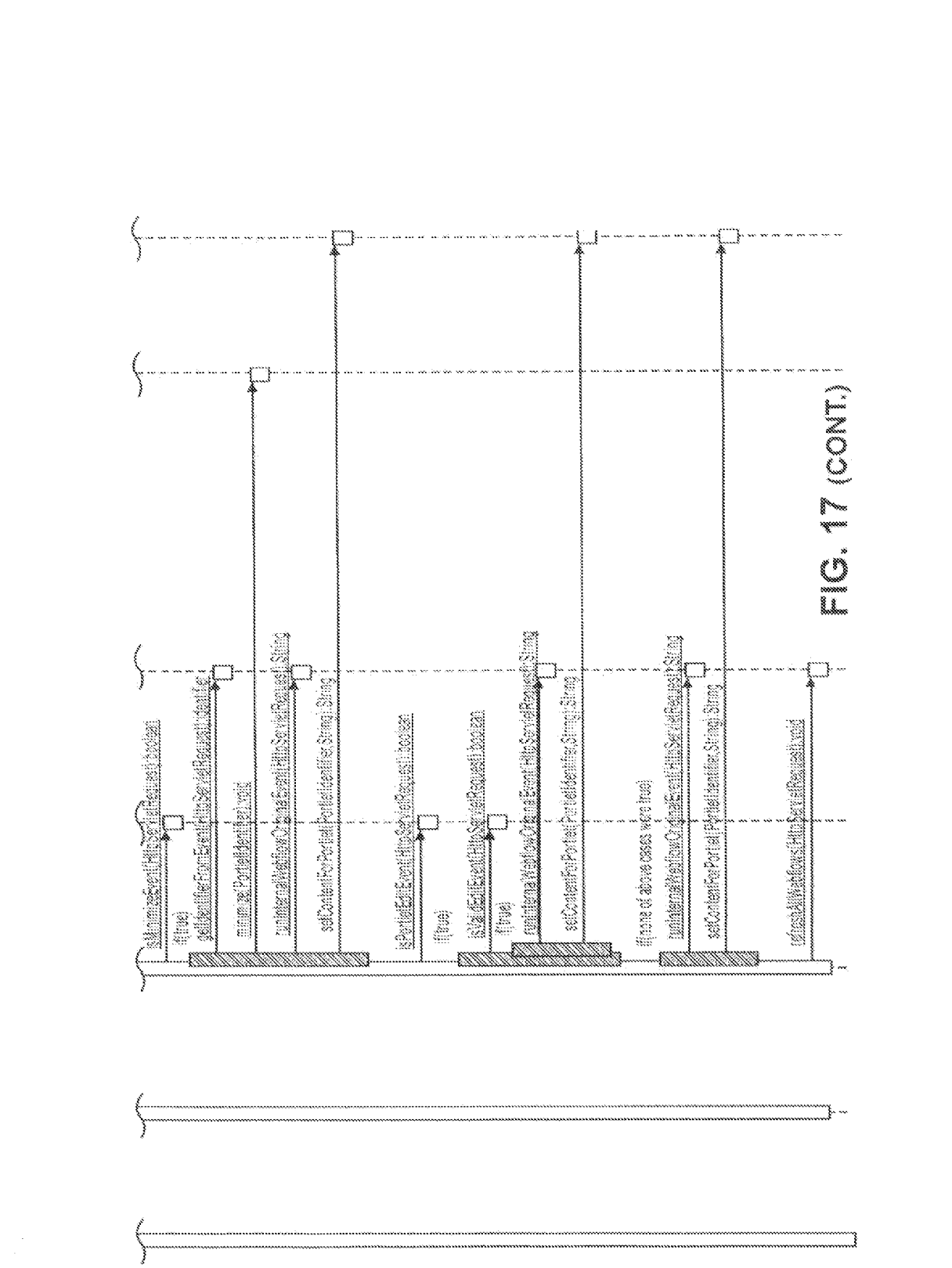

SYSTEM AND METHOD FOR APPLICATION FLOW INTEGRATION IN A PORTAL FRAMEWORK

CLAIM OF PRIORITY

This application claims priority from provisional application "ENHANCED PORTALS [FLAGSTAFF RELEASE]" Application No. 60/386,487, filed Oct. 24, 2001, and incorporated herein by reference.

CROSS REFERENCE TO RELATED APPLICATIONS

This application is related to application "SYSTEM FOR MANAGING LOGICAL PROCESS FLOW IN AN ONLINE ENVIRONMENT; Inventors: Neil Smithline, and Sathyanarayana Giridhar, application Ser. No. 09/908,023, filed Jul. 18, 2001, and subsequently issued as U.S. Pat. No. 7,051,069, which is incorporated herein by reference.

FIELD OF THE INVENTION

The invention relates generally to portals, and particularly to a system and a method for providing application flow integration in a portal framework.

BACKGROUND

In the world of e-commerce, portal systems and applications (more commonly referred to as "portals") are being increasingly used to provide software applications and services to end-users and third-parties. This is particularly important in the business enterprise environment, or on the Internet (where portals are often referred to as "Web portals"), since the portal can be used to group together and manage a large number and a wide variety of applications in a manner that allows those applications to be effectively delivered to a large number of users, each of which may have very different needs and access rights. The portal provides a central access point and a common look-and-feel to the end user. Portals can also be used to support collaboration between different parties, so that for example, a third-party vendor application can be integrated seamlessly within the enterprise platform.

Typically, the portal resides atop an application server, such as the WebLogic server product from BEA Systems, Inc. A product such as BEA WebLogic Portal, for example, delivers a single, unified portal framework for all enterprise requirements by providing foundation services that allow for sophisticated portal development; personalization and interaction management, intelligent portal administration to simplify and speed portal deployment; and portal integration services that allow application integration within and beyond the enterprise. Portlets, smaller pre-built modular applications that are primarily based upon Java Server Page (JSP) technology, execute within the portal, and can be provided either as part of the portal or can be created by third-parties. Portlets enable fast, out-of-the-box assembly and deployment of an enterprise portal solution by providing common application capabilities.

One of the problems with current portal offerings is they lack a convenient mechanism to integrate the flow of a complex software application ("application") within the framework of the portal, so that the portal developer can easily include logic for portal-related events. What is needed is a mechanism for allowing the portal and the portlets, and other components therein, to communicate with each other in a manner that supports application flow within the portal as a whole.

SUMMARY

The invention relates generally to portals, and particularly to a system and a method for providing application flow integration in a portal framework. In accordance with one embodiment, the invention comprises a portal servlet, which handles all incoming servlet requests and determines whether the incoming request represents a request either for a portal page or for a non-portal page; and, a portal processor which handles all portal page requests passed by the portal servlet, and executes an appropriate webflow to update the current state of the portal page, depending on a current set of events.

BRIEF DESCRIPTION OF THE DRAWINGS

FIG. 12 shows a class diagram of the portal appflow common package in accordance with an embodiment of the invention.

FIG. 13 shows a class diagram of the portal servlet in accordance with an embodiment of the invention.

FIG. 17 shows a sequence diagram for a portal processor sequence in accordance with an embodiment of the invention.

DETAILED DESCRIPTION

Figure 1:
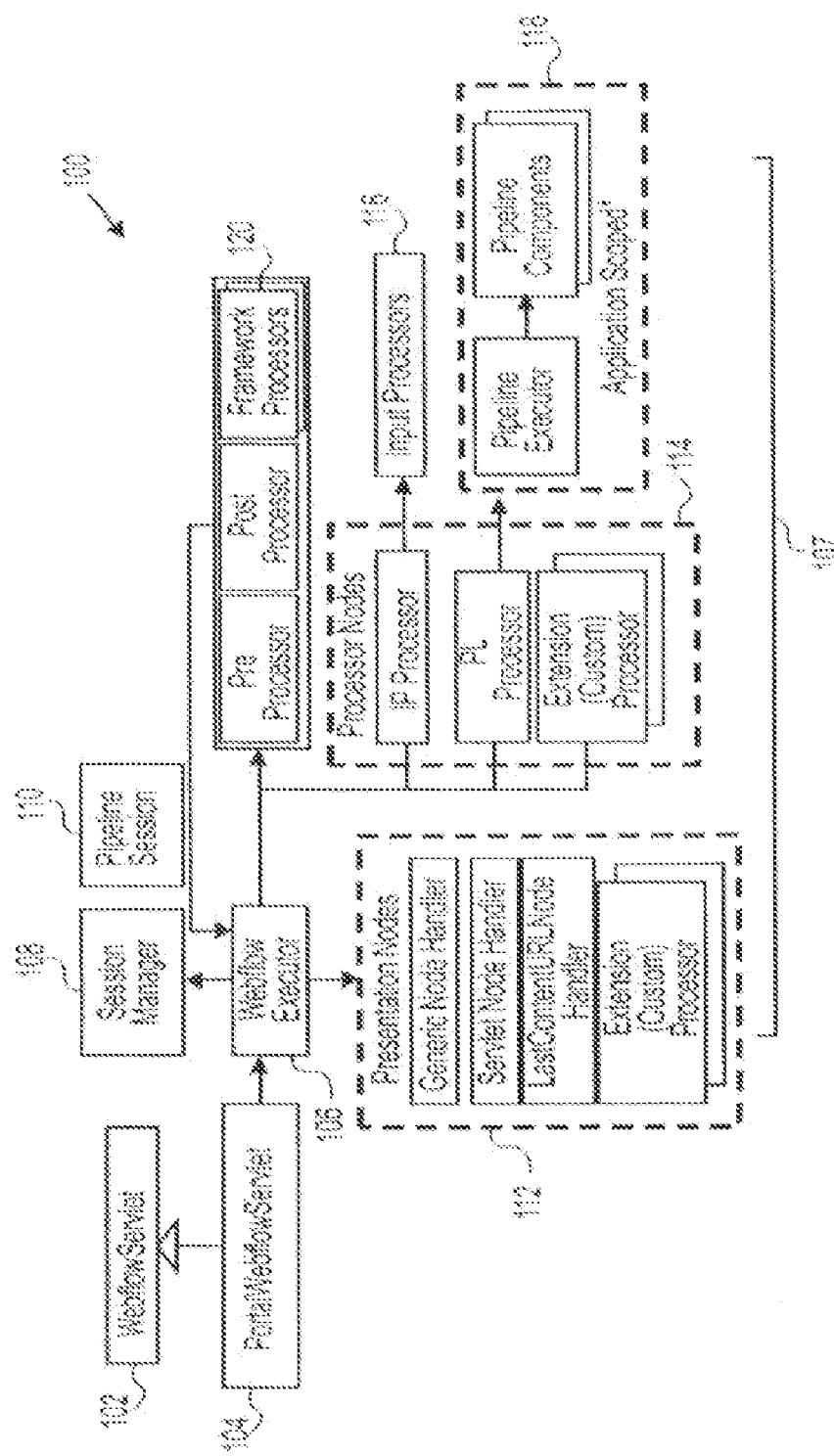
FIG. 1 shows an architectural overview of a portal webflow in accordance with an embodiment of the invention.

Disclosed herein is a system and a method for providing software application flow integration within a portal framework. In particular, the disclosed invention allows a portal framework to be supplemented with logical flow features such as webflow and pipeline functionality. As used herein a "webflow" is a state-machine-like mechanism that can be used to describe the flow of application logic throughout the Web site or portal, including the execution of business logic, error handling and dispatching. The flow is based on both user events and programming events. This state machine is then used as input to a webflow processor that guides the system, and that combines Web links, form submissions, form processing, business logic execution, and business logic exceptions, into an easily managed schema. Any required change to the logic flow of the system can be made by modifying just the webflow itself.

Typically, the webflow guides the progress of the interaction of the user with the actual e-commerce application. In many cases, the e-commerce system or application may be a Web site hosted on a Web server. Different types of application code can be used to track and to modify the user interface. These may include Java Servlet Pages (JSPs); input processing code which is used to modify the user input; and pipeline processing code. When properly configured, the webflow represents a tree structure along which the user is guided. The tree structure includes presentation nodes and actions nodes. Presentation nodes are what the customer actually sees in their browser, for example, these may include HTML and JSP files. While viewing the output from a presentation node, the customer's data is stored in a pipeline session. A pipeline session is a set of attributes which may in one embodiment be name value pairs which hold pertinent data on a given customer during a given session. Since the webflow acts like a state like machine, the pipeline session defines a current state for a given customer. The data stored in the pipeline session are used throughout the webflow to provide information to other features and services.

Action nodes perform the actual work for the e-business site, and include such features as input processors and pipelines. Input processors handle the attributes of the pipeline session. Typically the input processor may either: (a) put the attribute in the pipeline session; (b) modify the value of existing attributes within that pipeline session; or (c) validate values of particular attributes within the pipeline session. A pipeline controls the flow of the business logic within the e-commerce site. Typically the pipeline comprises many pipeline components. A pipeline component is an object responsible for doing a particular portion of the business logic. Each pipeline component is thus a unit of business functionality. The developer may combine the use of a webflow together with input processors and pipeline to modify their business functionality with ease of use and in real time. Further details about the use of webflow and pipelines in an e-commerce environment is presented in co-pending application "SYSTEM FOR MANAGING LOGICAL PROCESS FLOW IN AN ONLINE ENVIRONMENT; Inventors: Neil Smithline, and Sathyanarayana Giridhar, incorporated herein by reference.

The present invention provides a mechanism for providing software application flow integration, including such features as the webflow and pipelines described above, within a portal framework. In particular, the disclosed invention provides patterns for using webflow and pipeline technologies within a portal or with portlets. This allows the invention to provide a declarative means for developing portals and portlets. In addition a framework is provided for handling portal page events and portlet window events. A declarative means is provided for portal developers to add additional logic for framework supported events. A declarative means is also provided for handling any portal or portlet events. Lastly, a means is provided for communicating between the portlets and/or the portal and portlets.

The use of Webflow is not mandatory in developing the portal—instead it may be considered an advanced feature of the Portal development platform. Whether webflow is used in a particular portal depends on the particular needs and design of the application. Some reasons to use Webflow in individual portlets include:

To separate business logic from presentation;
To coordinate the navigation of a Web site with the execution of business logic;
To reuse existing InputProcessors and PipelineComponents; and,
To link business logic execution across portlets.

Throughout the following description of a particular embodiment, it is assumed that only one portal may be deployed per web application; and that a portal web application may include conventional web pages (non-portal pages), along with the portal (portal page, maximized portlet page). However, it will be evident to one of skill in the art that in alternate embodiments of the invention different assumptions may be made.

Portal Web Application

A portal web application is usually comprised of a portal jsp page and, optionally, one or more conventional web pages. The invention assists in declaring access to, and transition between, the portal jsp page and conventional web pages, including for example in the following cases:

Initial access to the portal from outside the web application,
Changing the portal page (tab),
Refreshing the portal,
Portlet window events,
Generic portal links, and,
Generic portlet links.

Component Level Architecture

Functionally, five primary components make up the design: Portal Servlet, Portal Processor, PortalState object, PortalSession object and the Portal Manager.

The Portal Servlet handles all incoming servlet requests and determines whether they represent a request for either a portal page or a non-portal page. Non-portal page requests utilize the standard webflow (as described in further detail in copending application "SYSTEM FOR MANAGING LOGICAL PROCESS FLOW IN AN ONLINE ENVIRONMENT"; Inventors: Neil Smithline, and Sathyanarayana Giridhar), and are routed to the standard webflow executor unmodified. Portal page requests are however directed through the webflow executor to the Portal Processor for subsequent handling.

The Portal Processor handles all portal page requests. For each request, the Portal Processor obtains the current PortalState object for the request, and then executes appropriate framework logic to adjust the current state depending on the current appflow event. The Portal Processor then invokes webflow namespaces for the portal and all portlets to be rendered for the request. The webflow namespaces should declaratively cause execution of appropriate business logic for the given request. When the Portal Processor returns, it provides a URL to the Portal Servlet which is used to forward the request to the appropriate servlet (or jsp).

The PortalState object represents the current state of the Portal for the current user. The object returned by the Portal Manager contains only the persistent state for the current user. The Portal Processor augments this persistent state with the state of the current session (PortalSession). From the view of the rendering engine, realized in portal.jsp, the PortalState object contains all state for the current user, i.e. both the persistent and the session-based state. PortalState objects are intended to be used only for a single request.

The PortalSession is used to maintain the current portal page (tab) for the user and the content jsp page for each portlet.

The Portal Manager provides an interface between persisted portal data (XML and database data) and the clients of that data. The Portal Manager, with the aid of the entitlement engine, assembles a PortalState object for the current user and returns it to the client.

Webflow and the Portal Platform

To customize the behavior of the portal Web application, whether this means creating special navigation logic for a simple portlet, or developing complex business and presentation framework customizations that change the portal platform, to suit a particular business case, a basic understanding of Webflow is required. FIG. 1 shows the architecture of the portal framework or platform 100 in accordance with an embodiment of the invention, and illustrates how Webflow functionality can be implemented within the portal application. Because its main function is to serve as a structure of reusable presentation and navigation modules, the Portal framework itself can be thought of primarily as one large Webflow application. For the most part, Webflow functionality is invoked in a similar way within the Portal framework as it is within the WebLogic Server platform (as described in further detail in copending application "SYSTEM FOR MANAGING LOGICAL PROCESS FLOW IN AN ONLINE ENVIRONMENT"), with the primary difference being that the Webflow servlet performs most of the routing between validation, session logic and custom processor nodes. As shown in FIG. 1, the webflow servlet 102 passes all portal page requests via the portal webflow servlet 104 to the webflow executor 106, for subsequent handling by the portal processor 107. For each request, the portal processor obtains the current portal state object for the request, and then executes appropriate framework logic 112, 114, 116, 118, 120, and knowledge of the current session 108, 110, to adjust the current state depending on any current application flow event. The portal processor returns a URL to the portal servlet which is then used to forward the request to the appropriate servlet or jsp.

Webflow and Portal can be thought of as two complementary navigation mechanisms. The portal platform provides an array of content placeholders, each able to function as a virtual browser that controls its own state without influencing the state of its neighbor portlets. The Webflow mechanism is designed to enable the navigation logic of a web application to be controlled by a multitude of factors, so that Personalization, etc., can all be coordinated to influence what is presented to the Web site visitor at runtime. Each individual portlet can be assigned its own particular Webflow. The following section explains the basic requirements in using Webflows with portlets.

Portlets and Webflow

The Webflow associated with portals are generally not edited by the application developer because it is fundamental to the application logic that makes up the portal platform. Individual portlets, however, can have individual webflows (in the form of Webflow files) assigned to them, allowing Webflow functionality to be applied to each portlet.

Portlet Webflow Parameters

Portal Webflow is invoked with the following three parameters:

Portlet Webflow Namespace: Portlet namespace handling allows the Webflow Servlet to discern individual portlets when handling events within a portal.

Event: Portlet Webflows listen for as many as seven events related to user actions within a portlet.

Origin: Unlike a typical web application using Webflow, the Portal server must keep track of the current node for each portlet Webflow being displayed. This current node information may be considered for each new event.

In one embodiment, the portal framework uses the following portlet events, all of which must be handled when Webflow is invoked:

Refresh—Required of all Webflows,

Maximize—Required if Maximizable and no Maximize URL specified in portlet definition, unMaximize—Required if Maximizable and no Maximize URL specified in portlet definition, Edit—Required if Editable and if no Edit URL specified in portlet definition, unEdit—Required if Editable and if no Edit URL specified in portlet definition, Minimize—Required if portlet is minimizable (No Minimize URL needed), unMinimize—Required if portlet is minimizable (No Minimize URL needed).

These events are called when the corresponding actions are performed, and are handled by the portal framework. These events can be used within custom portlets, and a developer can also define their own events. Custom events can be added if desired, and can be triggered from within custom portlets, or alternatively they can be triggered by portlet framework events.

The Refresh Event

Understanding Webflow in portals requires a grasp of the Refresh event. To illustrate the way this event is used, consider the page view 130 of the sample portal screenshot shown in FIG. 2. If a site visitor minimized portlet2, a refresh event would be sent to both the other portlets 131, 133 via the PortalWebflowServlet 104, illustrated in FIG. 1. It is this refresh event which allows one portlet to communicate with or respond to another portlet.

The Origin Parameter

Figure 2:
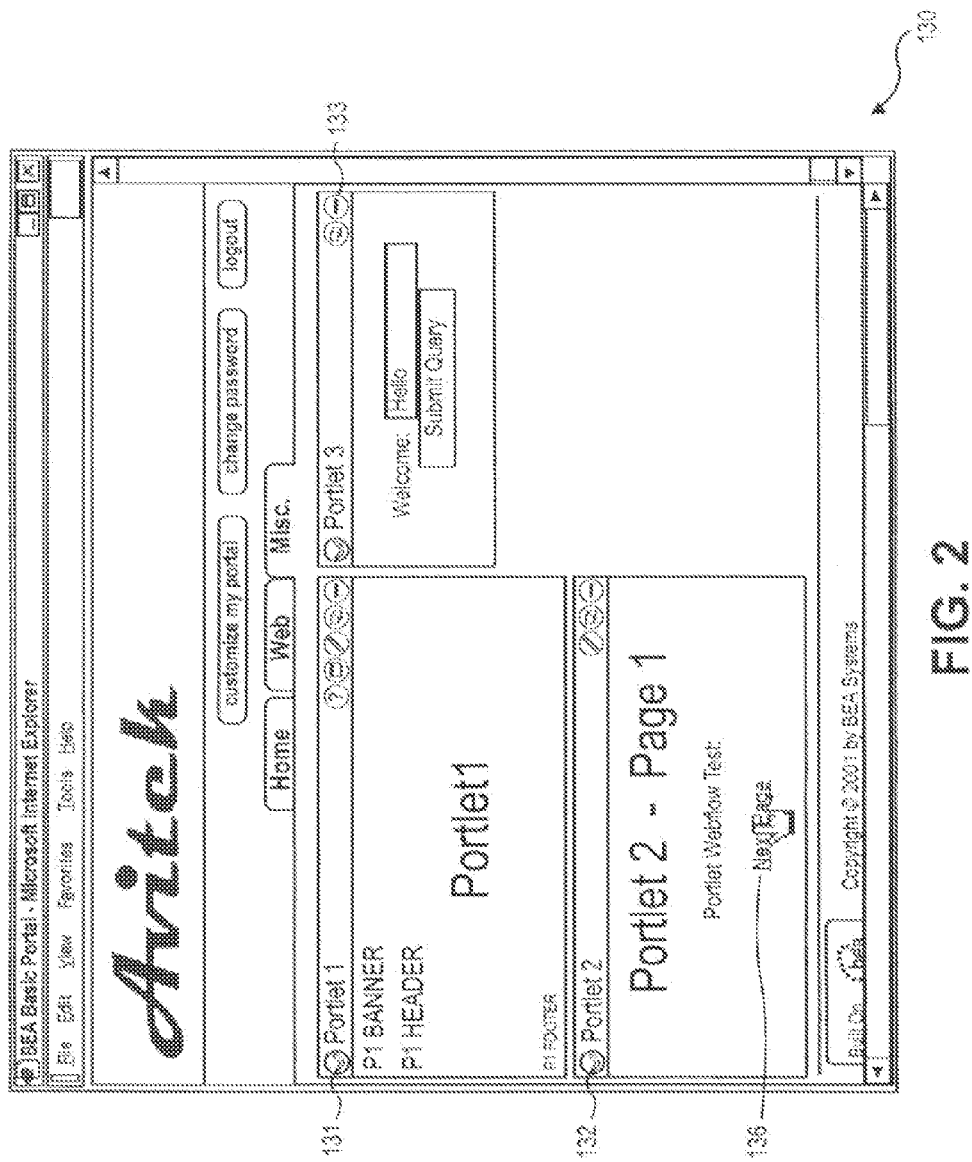
FIG. 2 shows a screenshot of a portal page that uses webflow in accordance with an embodiment of the invention.

Portlet Webflows do not use Origin differently than other web applications. Consider what happens when a user clicks on the "Next Page" link 136 in Portlet2 as shown in FIG. 2. The Webflow fragment shown below indicates that the presentation node defined as the origin is "portlet," and the destination node declared for that origin is portletB.

```
<presentation-origin node-name="portlet"node-type="jsp">
    <node-processor-info page-relative-path="/portlets/portlet2" page-
    name="port]
    <event-list>
    <!-- next -->
    <event event-name="switch">
        <destination namespace="portlet2"
```

-continued

```
        node-name="portletB"
        node-type="jsp"/>
    </event>
  </event-list>
</presentation-origin>
```

Figure 3:
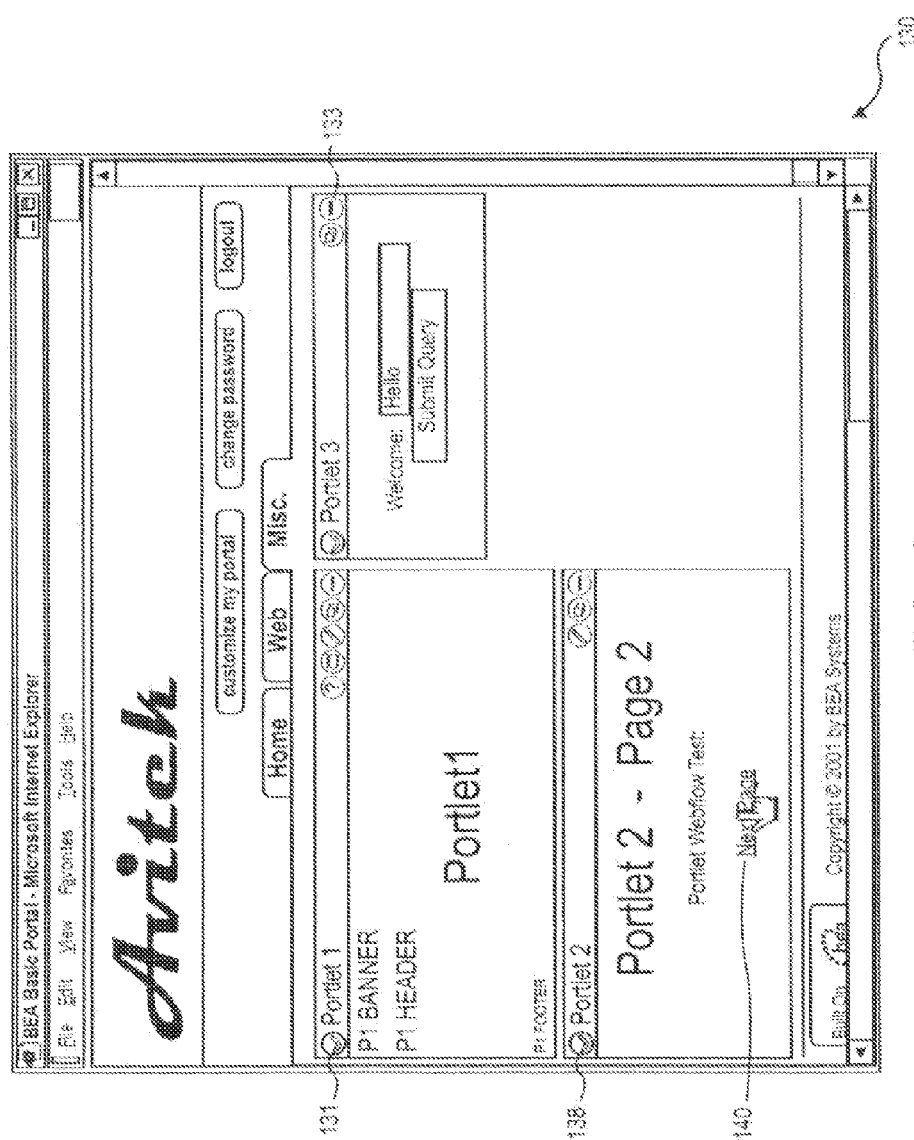
FIG. 3 shows a screenshot of a second portal page that uses webflow in accordance with an embodiment of the invention.

Clicking on the "Next Page" link in page 1 of Portlet2 takes the visitor to Page 2 (138), as shown in FIG. 3. To understand how the "Previous Page" link 140 on Page 2 is made to point to the initial presentation node designated for Portlet2, consider the Webflow fragment shown below:

```
<presentation-origin node-name="portletB" node-type="jsp">
    <node-processor-info page-relative-path="/portlets/portlet2" page-
        name"port
    <event-list>
    <!-- back -->
    <event event-name"switch">
        <destination namespace="portlet2"
            node-name="portlet"
            node-type="jsp"/>
        </event>
    </event-list>
</presentation-origin>
```

Considering this simple example illustrating the Origin parameter and the way Refresh events are handled in the portal framework, it is apparent that much customization can be accomplished without writing any Java code.

Figure 4:
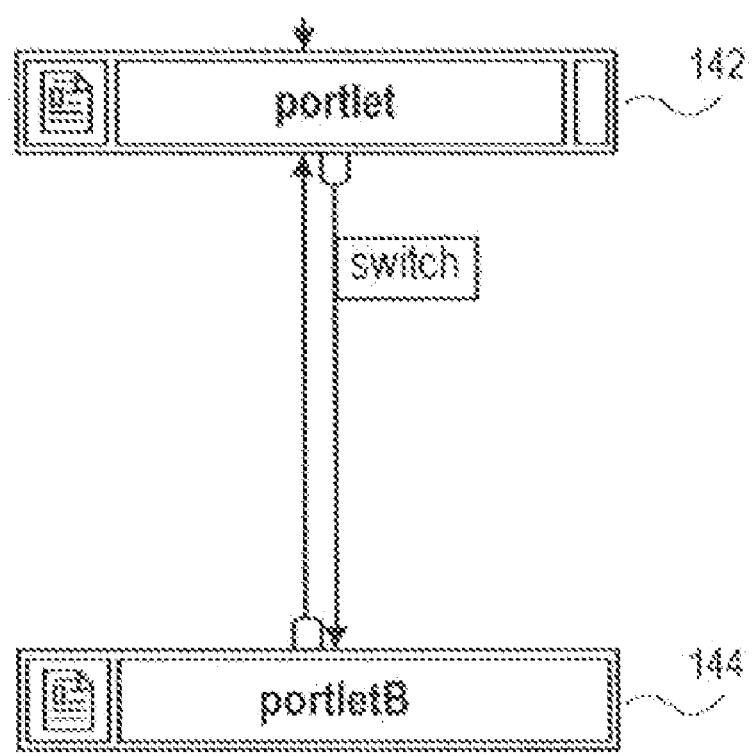
FIG. 4 shows an illustration of a portal webflow in accordance with an embodiment of the invention.

FIG. 4 is an image from the Webflow editor, which can be used to edit webflows for each portlet, showing an example of a portlet Webflow which navigates from one JSP 142 to another 144 and back.

A few general reminders should be followed when using webflows within portlets:

When using Webflow within a portlet, the developer must use a portlet-specific JSP tag. Where a non-portal web application would invoke Webflow using <wf:CreateWebflowURL/>tag, you would use the following tag within a portlet: <portlet:CreateWebflowURL/>.

To refer to the saved state of a portlet, LastContentURL can be used to denote a special destination informs the portal engine to display the last/current JSP. For example: <destination namespace="portal" node-name="lastContentUrl" node-type="portal"/>

Another special destination, "portalRefreshProcessor" is used to refresh the portal or return from a "regular" webflow back to the portal. For example: <destination namespace="portal" node-name="portalRefreshProcessor" node-type="inputprocessor"/>

For all refresh events, a wildcard event handler can be used with last LastContentURL. This enables back-end processing without changing the front-end state of the object.

Lifecycle for Initial Portal Access

Figure 5:
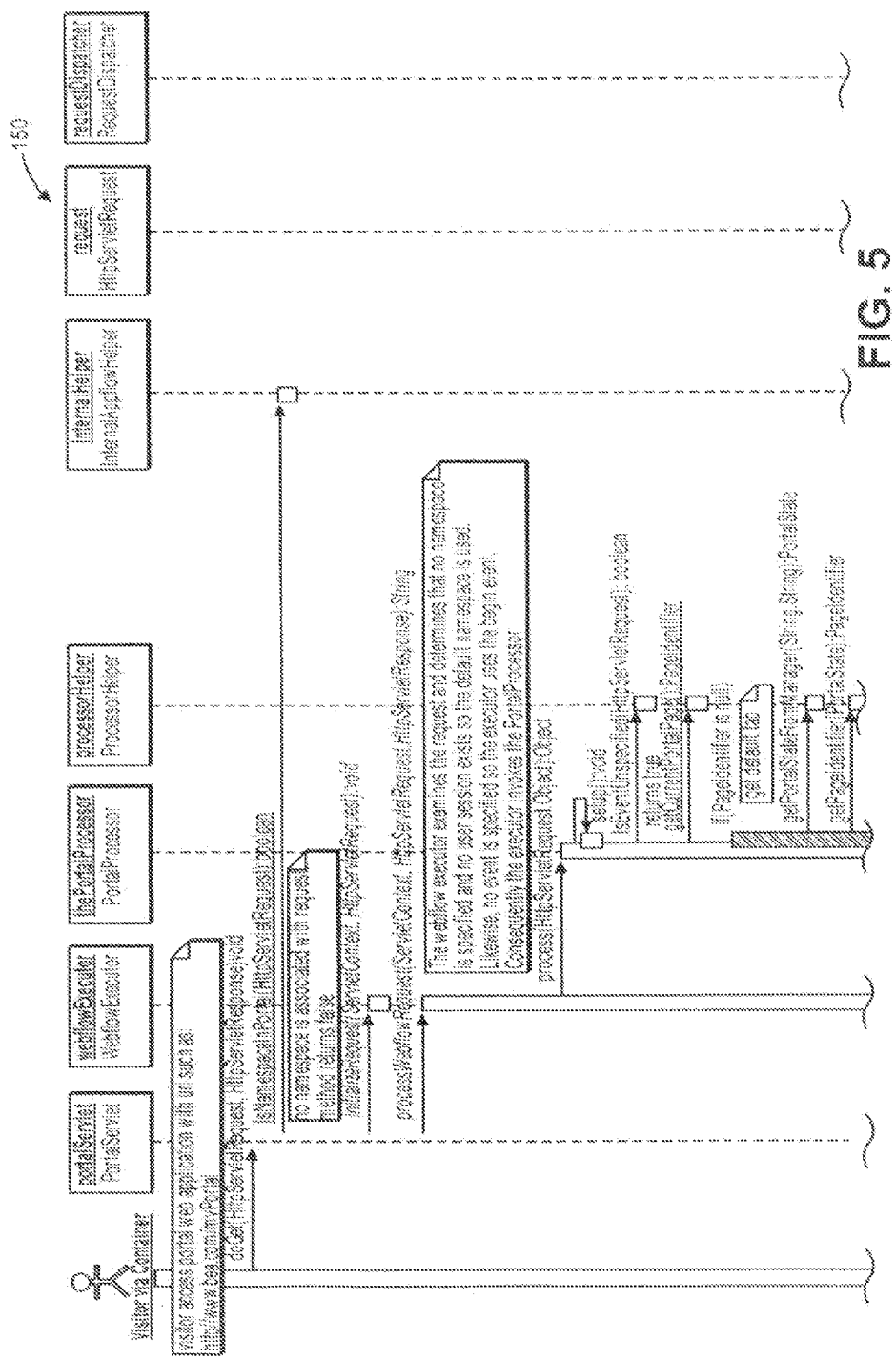
FIG. 5 shows a sequence diagram of a portal access in accordance with an embodiment of the invention.

FIG. 5 shows a sequence diagram 150 of a portal access in accordance with an embodiment of the invention, and illustrates accessing the portal from either inside or outside the current web application. As shown in FIG. 5, the user (or "visitor") accesses the portal web application (and the portlet) with an appropriate url. Since no namespace is associated with the request, the internal helper method returns false. The webflow executor examines the request and determines that no namespace is specified and no user session exists, so the default namespace is used. Likewise, no event is specified so the executor uses the begin event. Consequently the executor invokes the Portal Processor.

In the general case, access should be through a generic url, such as: http://www.company.com/myPortal (with no additional query string or extra path information), and the portal for an anonymous visitor at the default portal page (tab) should be displayed.

EXAMPLE URL

<host>:<port>/<portal web app>/
<host>:<port>/<portal web app>/namespace=<portal namespace>

Variations on the above include the ability to authenticate the visitor via a cookie, or by some other means, and render the default portal page (tab) for this visitor.

Changing the Portal Page

Figure 6:
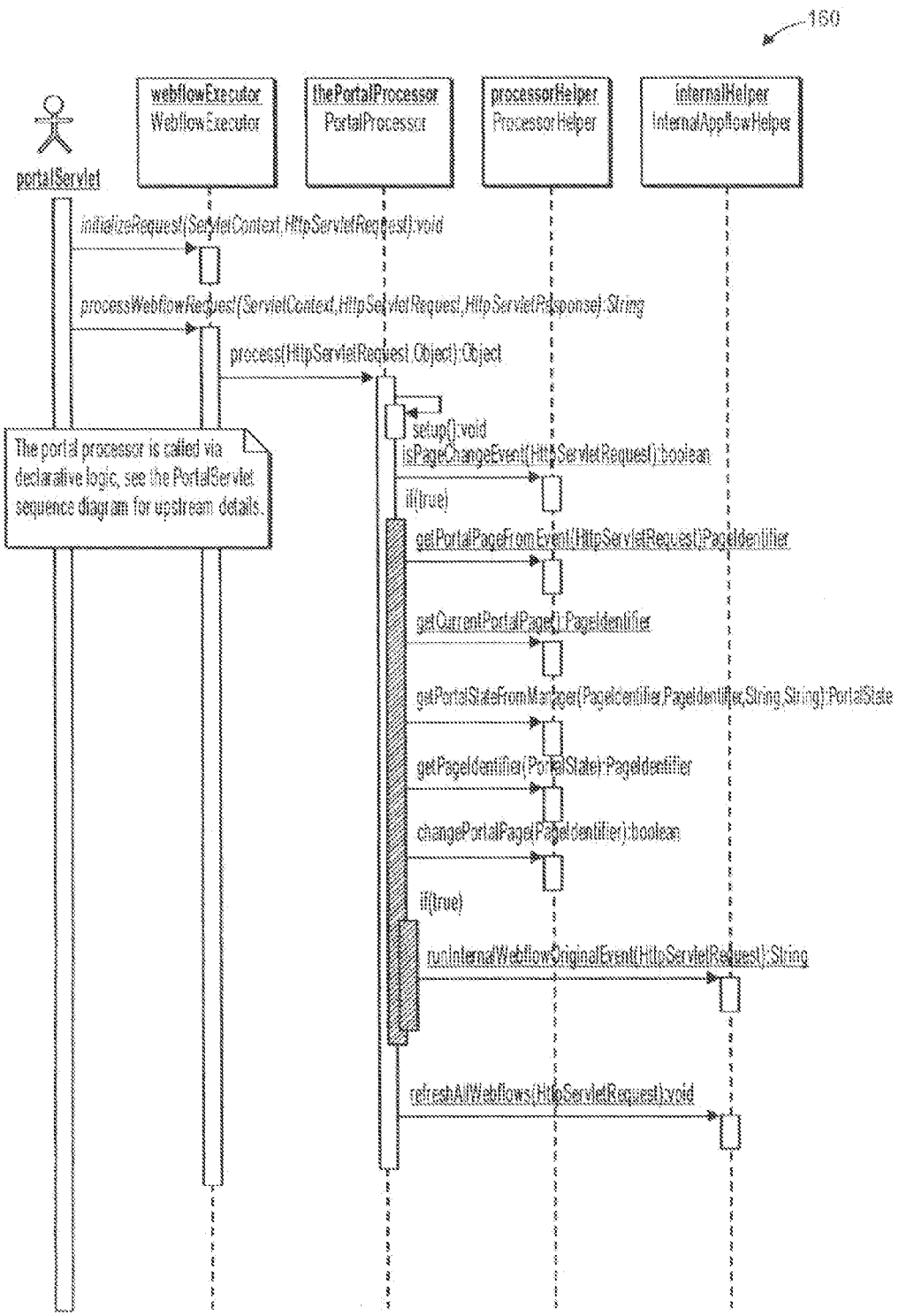
FIG. 6 shows a sequence diagram for changing the current portal page (tab) in accordance with an embodiment of the invention.

FIG. 6 shows a sequence diagram 160 for changing the current portal page (tab). The Portal Processor is called via declarative logic.

EXAMPLE URL

<host>:<port>/<portal web app>/namespace=<portal namespace>&origin=portal.jsp&event=portal.page.

Portal Refresh

Figure 7:
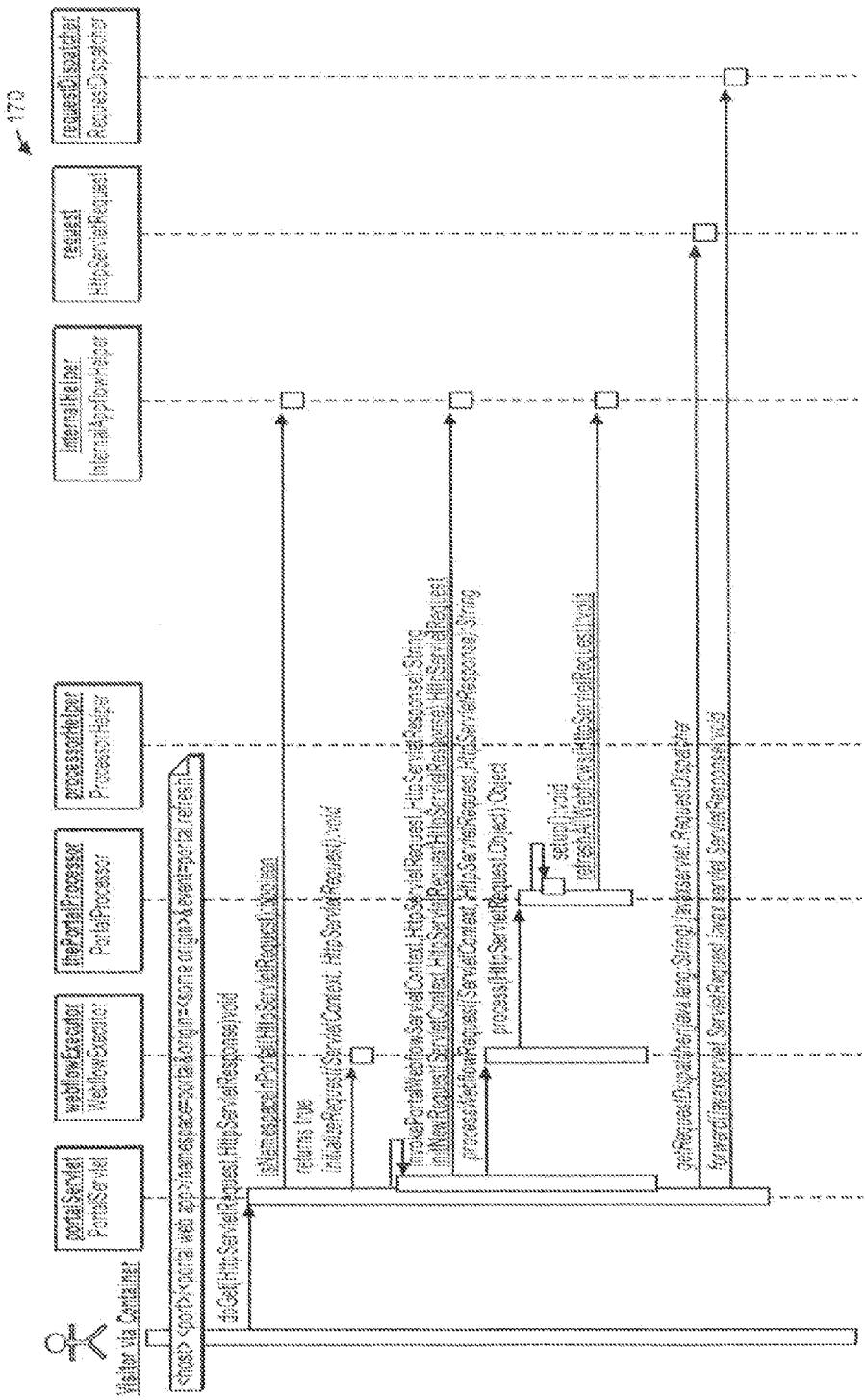
FIG. 7 shows a sequence diagram for re-rendering the portal in accordance with an embodiment of the invention.

FIG. 7 shows a sequence diagram 170 for re-rendering the portal.

EXAMPLE URL

Figure 8:
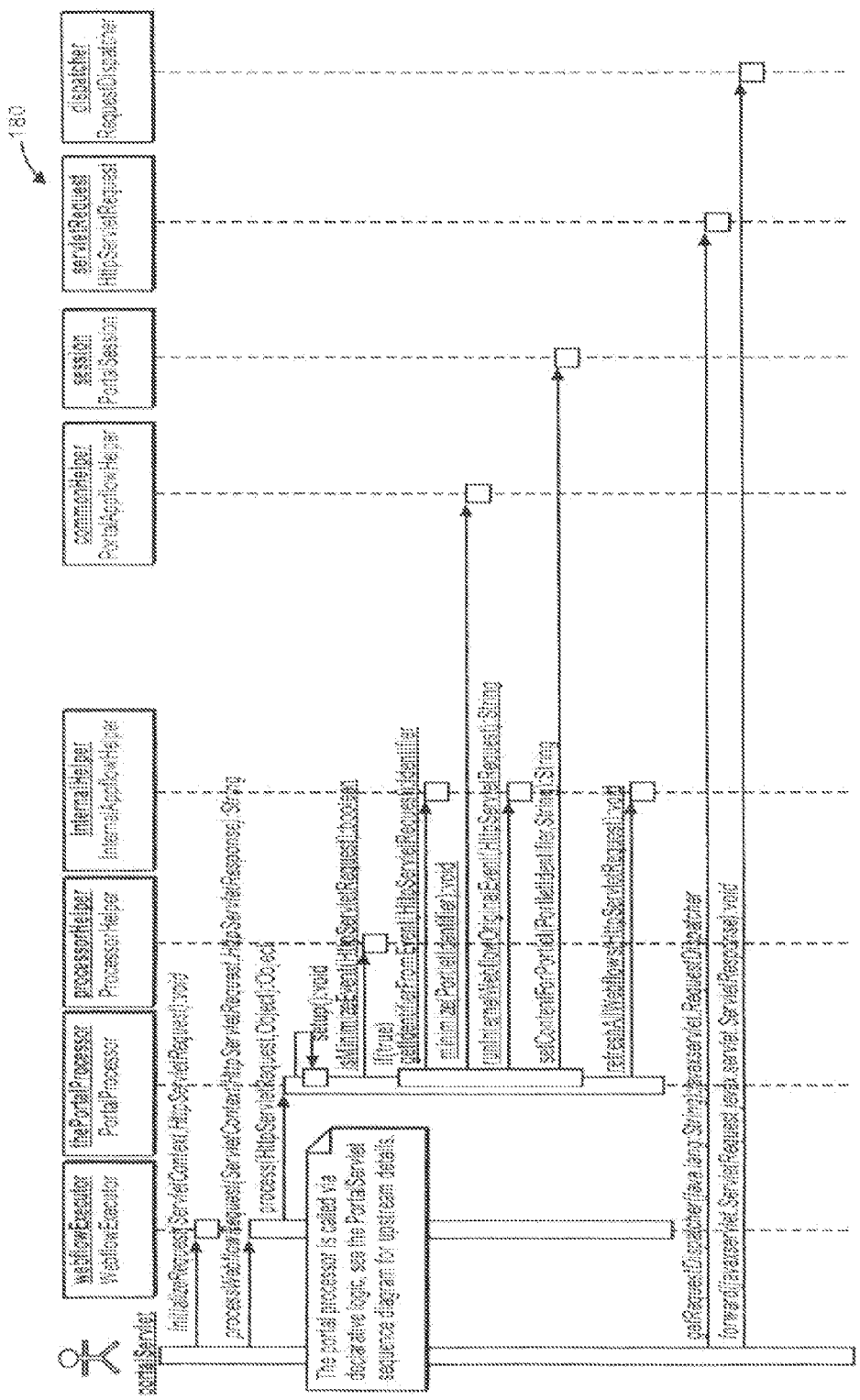
FIG. 8 shows sequence diagrams for various portlet window events including minimize, maximize, un-maximize and edit, in accordance with an embodiment of the invention.
Figure 9:
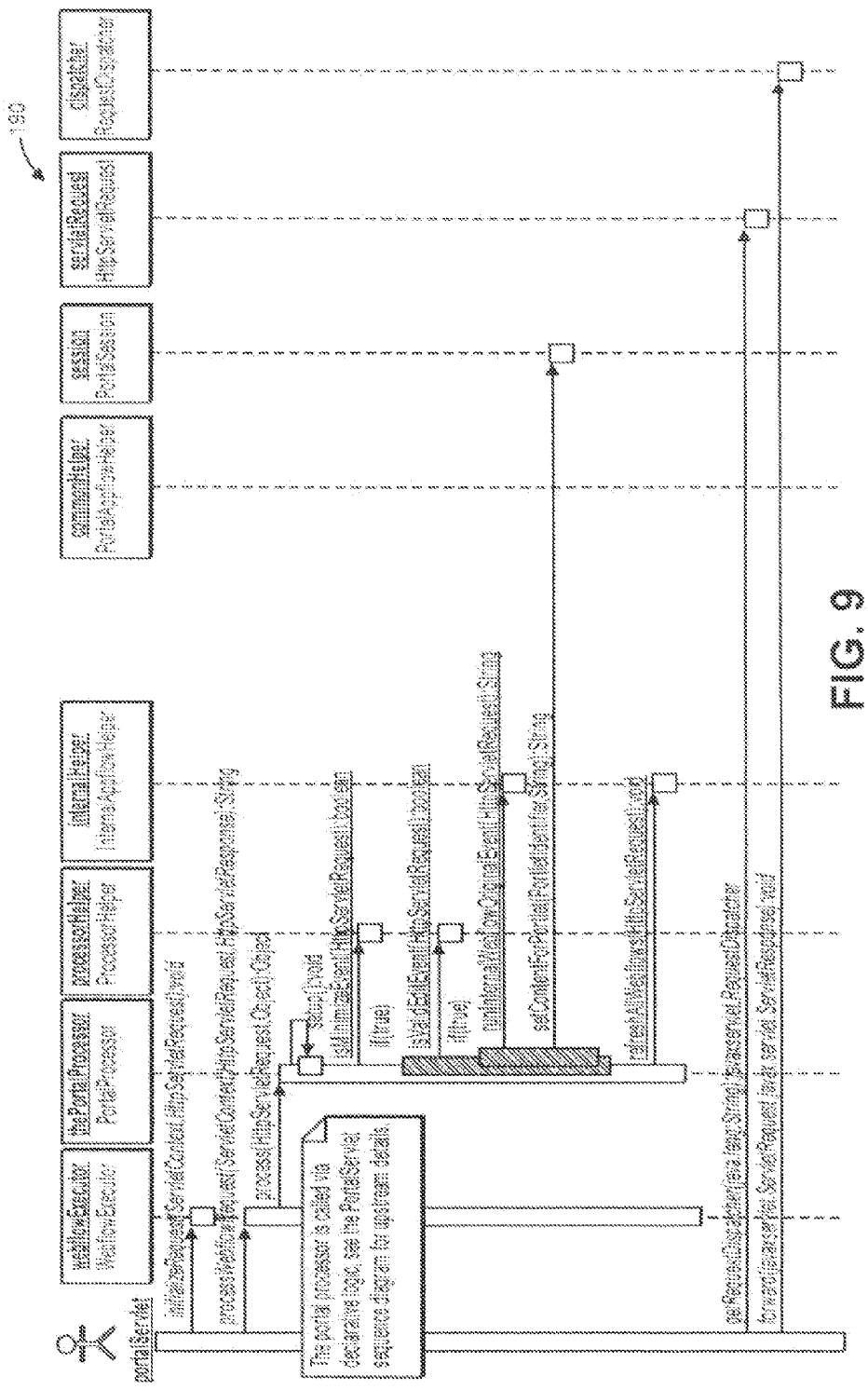
FIG. 9 shows further sequence diagrams for various portlet window events including minimize, maximize, un-maximize and edit, in accordance with an embodiment of the invention.

<host>:<port>/<portal web app>/namespace=<portal namespace>&origin=<some origin>&event=portal.refresh Portlet Window Events FIG. 8 and FIG. 9 show sequence diagrams (180 and 190 respectively) for various portlet window events including minimize, maximize, un-maximize and edit.

EXAMPLE URL

<host>:<port>/<portal web app>/namespace=<some portlet namespace>&origin=<some origin>&event=portal.portlet.<event> where <event> is one of minimize, maximize, unmaximize or edit.

Generic Portal Links

The application flow use cases described in further detail below illustrate several types of links that may be made available to a portal developer for use within portal areas of the portal page. These include "self"; "sibling'; "in"; and "out". The following are example urls that correspond to these link types:

Self: <host>:<port>/<portal web app>/ namespace=<portal namespace>&origin= <some origin>&event=<some non-portal event>

Sibling: <host>:<port>/<portal web app>/ namespace=<portal namespace>&origin=<some origin>&event=<some non-portal event>

(Sibling is the same as self but refreshing the portlets changes 1 or more portlet content pages)
>   In: namespace=<non-portal namespace>&origin=<some origin>&event=<some event>

(relative URL)
>   Out: <host>:<port>/<some web app>/

Figure 10:
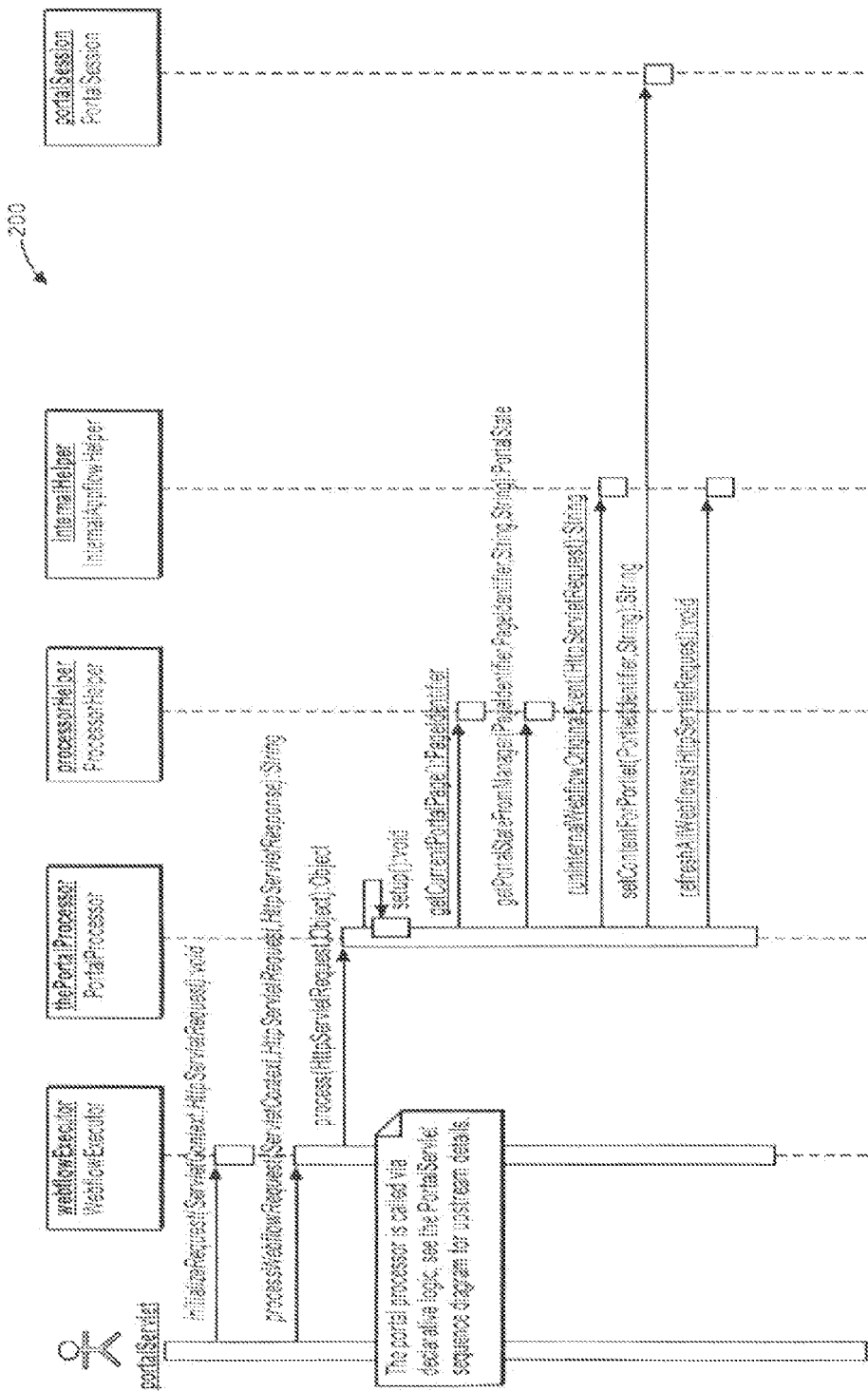
FIG. 10 shows a sequence diagram of the links to self and sibling in accordance with an embodiment of the invention.

FIG. 10 shows a sequence diagram 200 of the links to self and sibling.

Generic Portlet Links

The application flow use cases described in further detail below illustrate several types of links that may be made available to a portal developer for use within portlet areas of the portal page. These also include "self"; "sibling"; "in"; and "out". The following are example urls that correspond to these link types:

>   Self: <host>:<port>/<portal web app>/namespace=<some portlet
>       namespace>&origin=<some origin>&event=<some non-portal event>
>   Sibling: <host>:<port>/<portal web app>/ namespace=<some portlet
>       namespace>&origin=<some origin>&event=<some non-portal event>

(Sibling is the same as self but the portlet changes its content page)
>   In: namespace=<non-portal namespace>&origin=<some origin>&event=<some event>

(relative URL)
>   Out: <host>:<port>/<some web app>/

Figure 11:
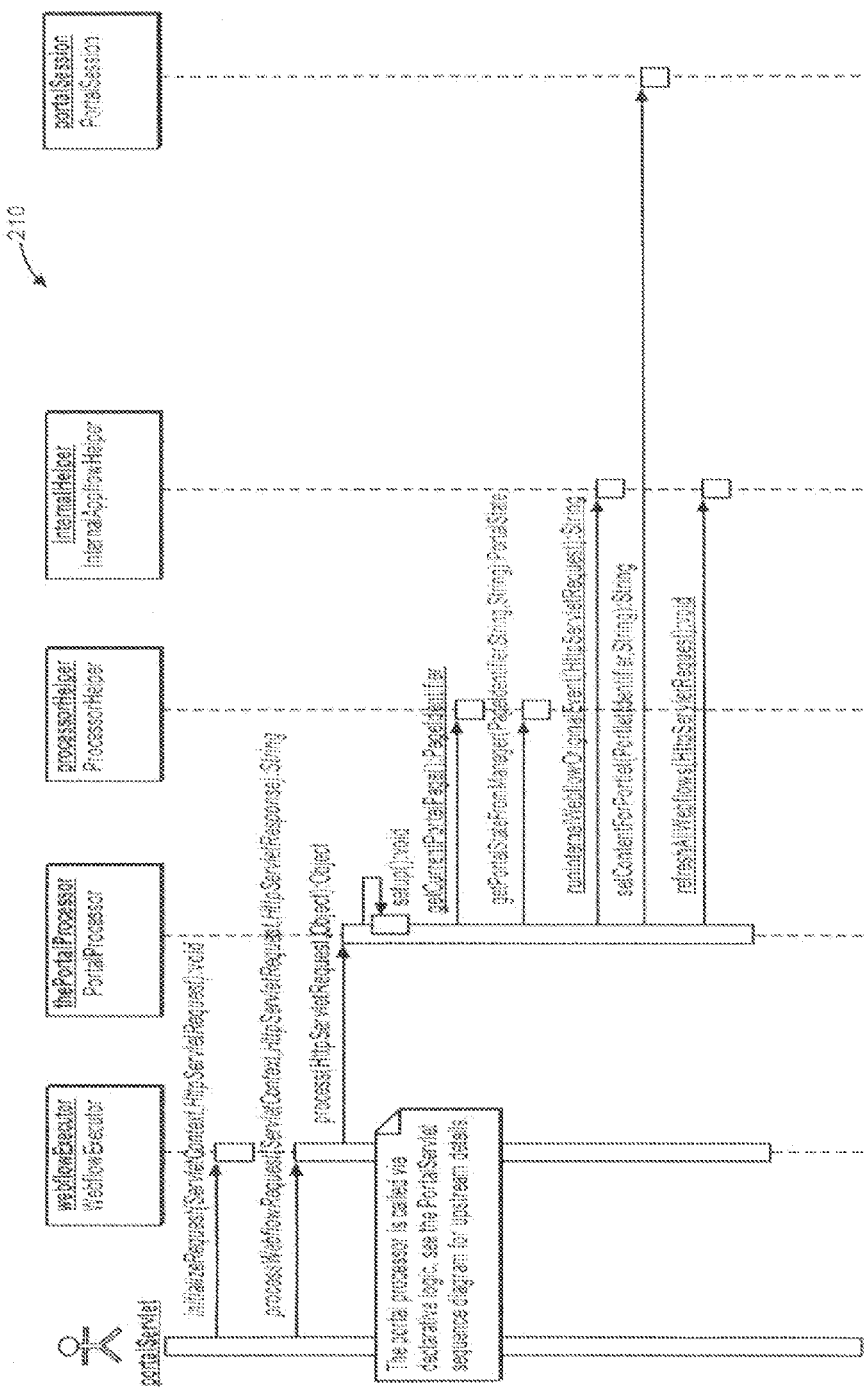
FIG. 11 shows a sequence diagram of the self to sibling in accordance with an embodiment of the invention.

FIG. 11 shows a sequence diagram 210 of the self to sibling.

Object Implementations

The following section describes some object implementations in accordance with a particular embodiment of the invention as it may be used with a product such as WebLogic Server from BEA systems, Inc. to provide application flow in a portal framework. The following object descriptions are not intended to be exhaustive but merely to illustrate a particular embodiment. It is intended that alternate implementations may be developed by those skilled in the art, within the spirit and scope of the invention.

Com.bea.portal.appflow.common Package

FIG. 12 shows a class diagram 220 of the portal appflow common package.

Com.bea.portal.appflow.servlet Package

FIG. 13 shows a class diagram 230 of the portal servlet.

Figure 14:
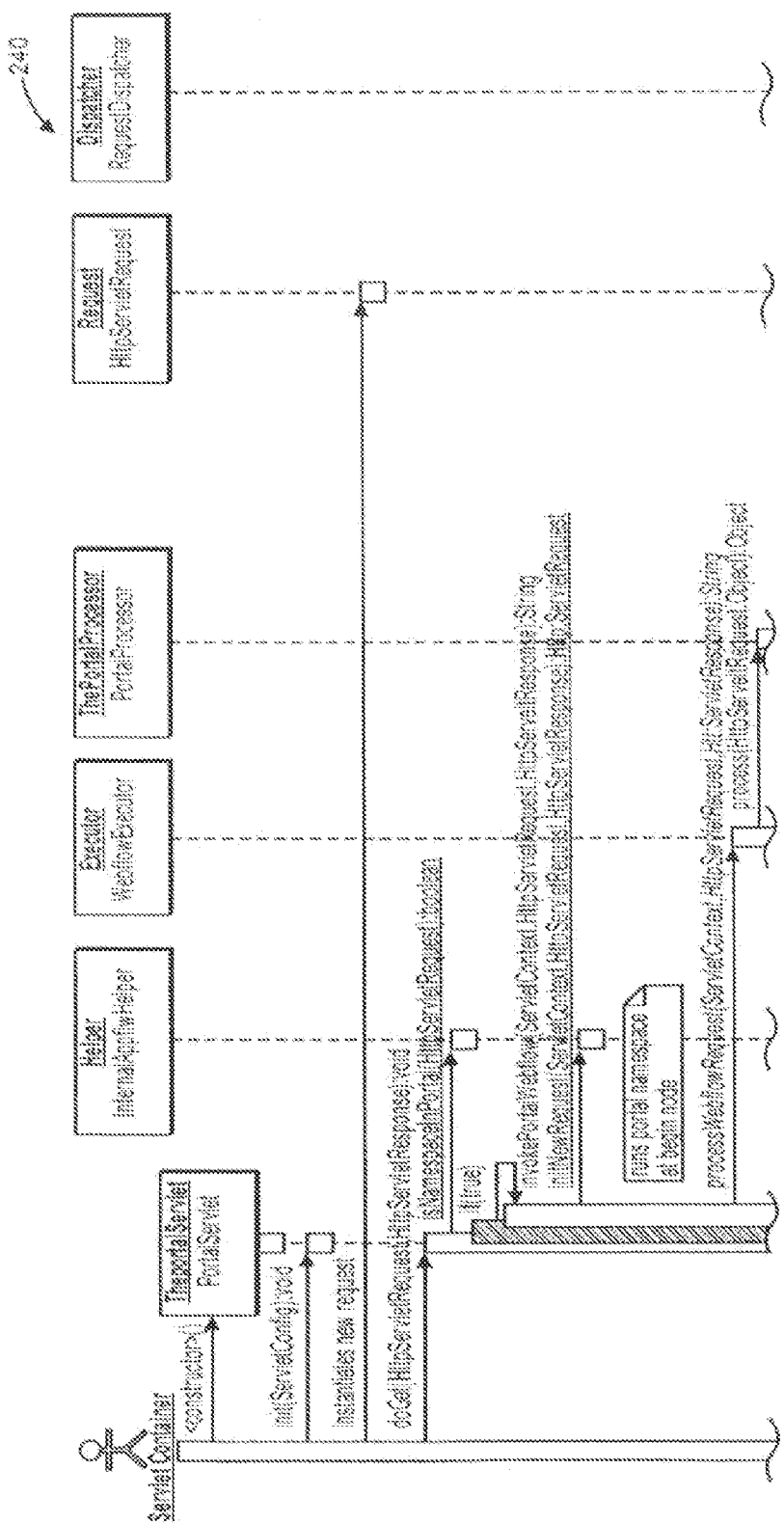
FIG. 14 shows a sequence diagram of a servlet dispatcher in accordance with an embodiment of the invention.
Figure 14:
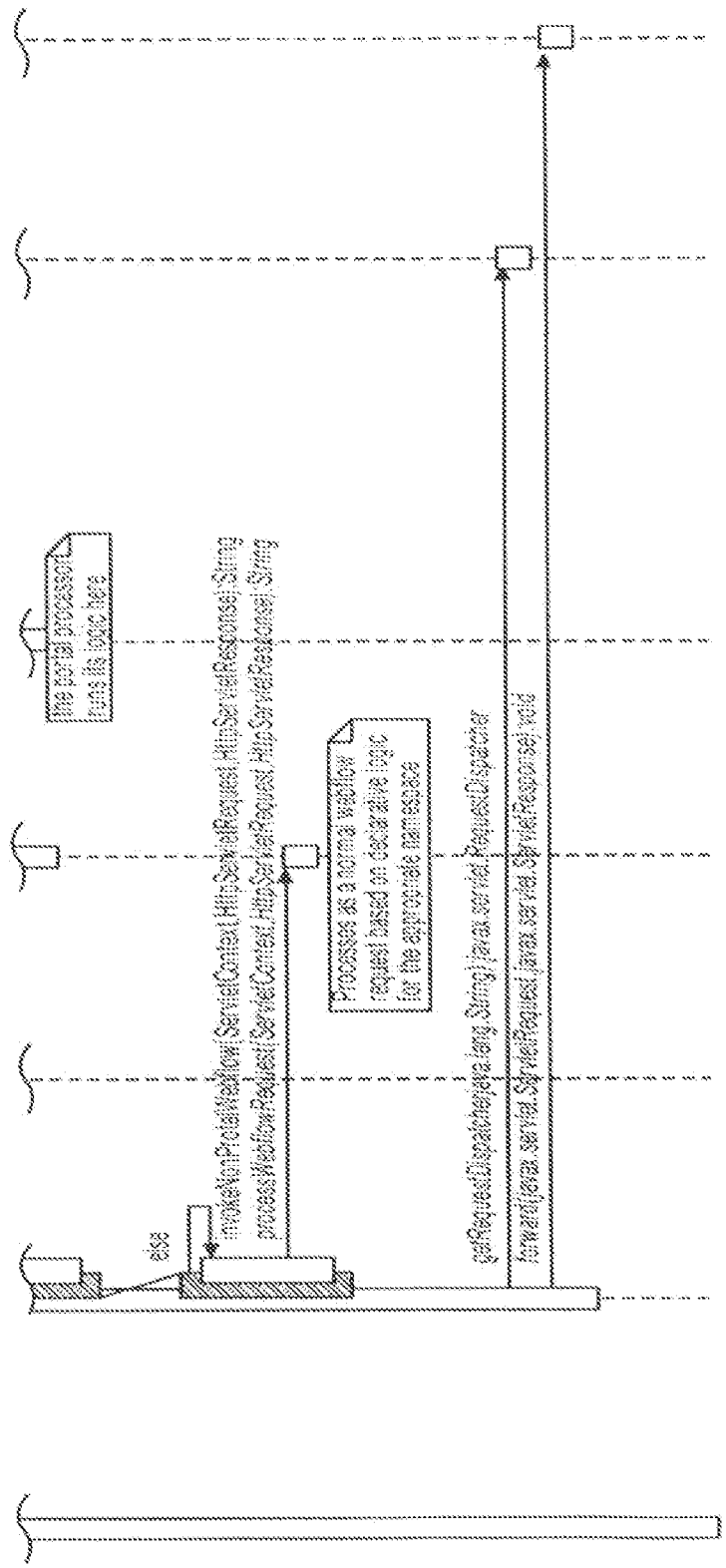

FIG. 14 shows a sequence diagram 240 of a servlet dispatcher.

Com.bea.portal.appflow.internal Package

Figure 15:
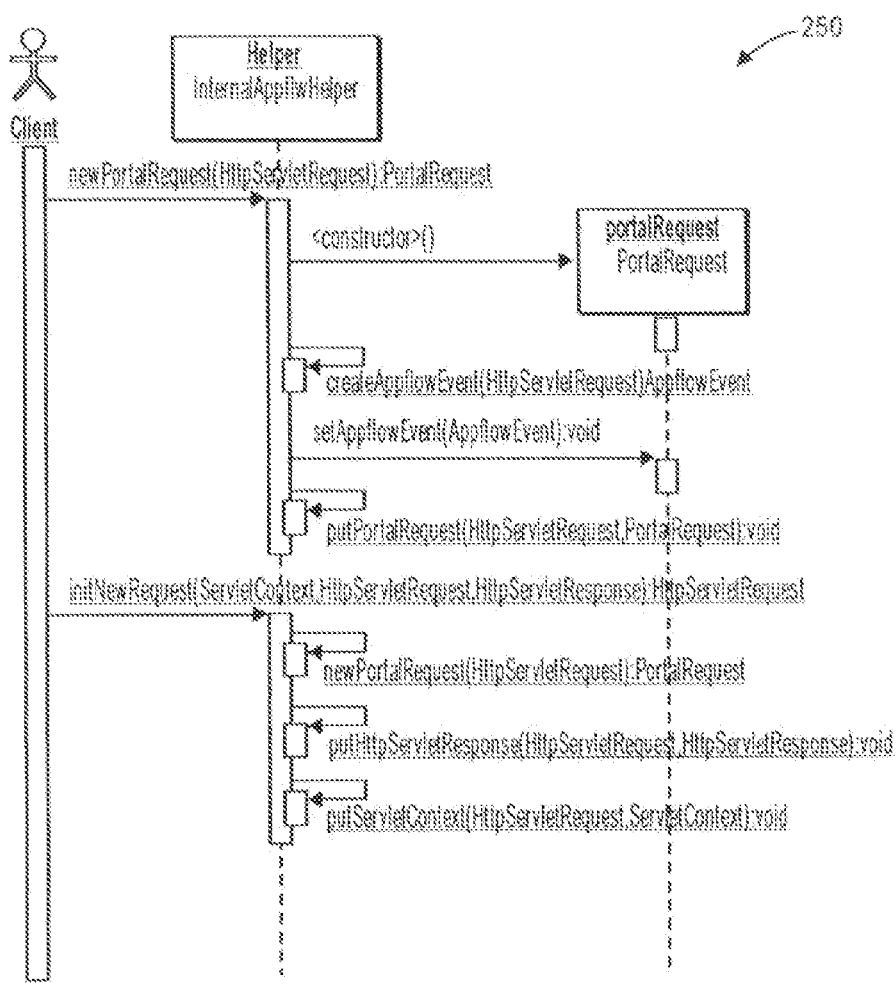
FIG. 15 shows a sequence diagram for helpers for a new servlet request in accordance with an embodiment of the invention.

FIG. 15 shows a sequence diagram 250 for helpers for a new servlet request.

Figure 16:
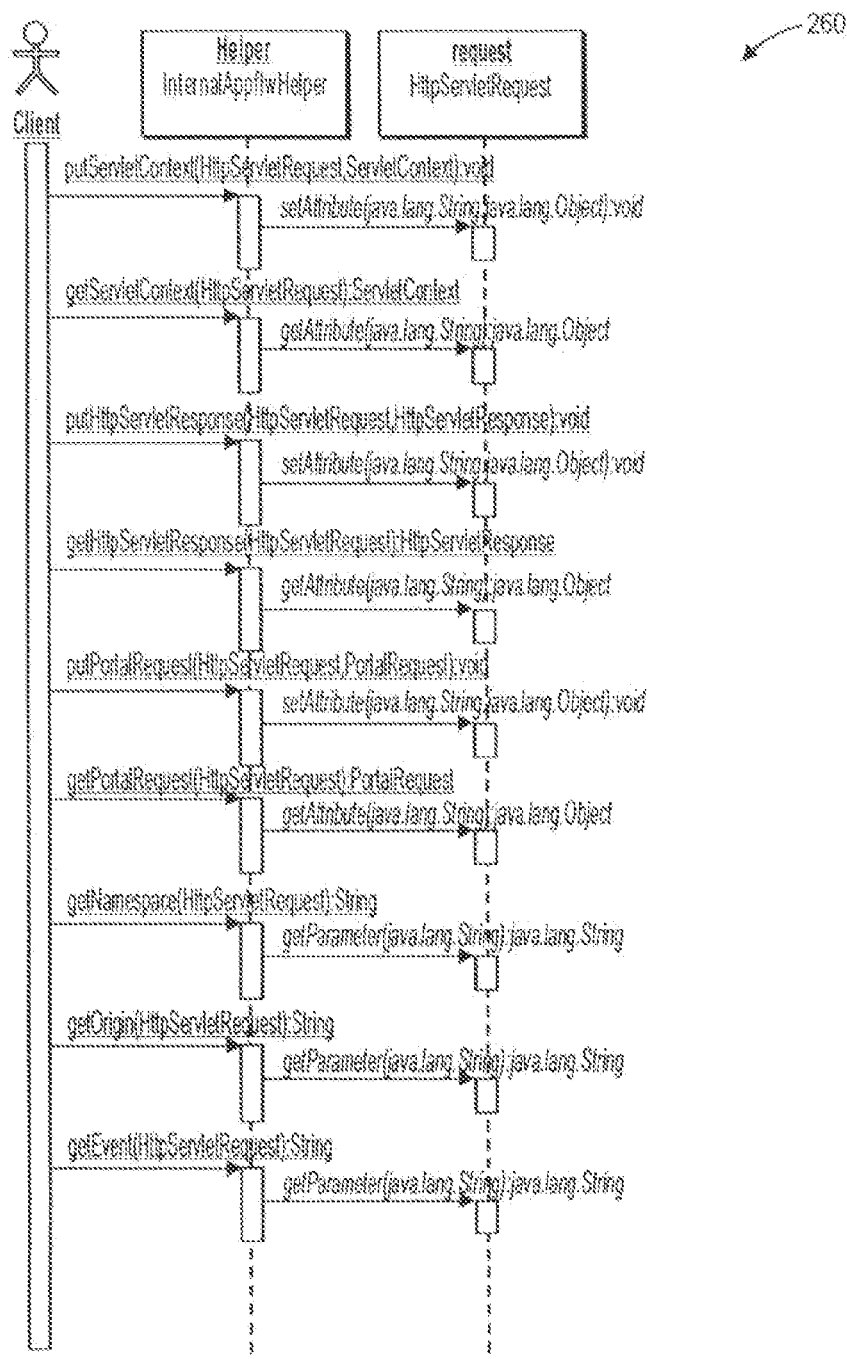
FIG. 16 shows a sequence diagram for helpers for manipulating HTTP servlet request attributes in accordance with an embodiment of the invention.

FIG. 16 shows a sequence diagram 260 for helpers for manipulating HTTP servlet request attributes.

FIG. 17 shows a sequence diagram 270 for a portal processor sequence.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing application flow integration in a portal framework, comprising:
   a portal that provides a central access point and common look-and-feel for users of the portal to applications running at the portal;
   a portal state object which represents the current state of the portal for a current user;
   a portal servlet, which handles all incoming servlet requests and determines whether the incoming request represents a request either for a portal page or for a non-portal page; and,
   a portal processor which handles all portal page requests passed by the portal servlet, and executes an appropriate webflow, including detecting a current set of events and the current state of the portal, to update the current state of the portal page and a flow of application logic within the portal, depending on the current set of events.

2. The system of claim 1 wherein said portal processor includes a webflow executor for receiving portal page requests and handling said portal page requests at the portal processor.

3. The system of claim 1 wherein said portal processor is used to invoke webflow namespaces for the portal and any portlets to be rendered for the request, and to provide a URL to the portal servlet which is then used to forward the request to an appropriate servlet or Java Server Page as determined by the webflow.

4. The system of claim 1 further comprising:
   a portal manager which provides an interface between persisted portal data and the clients of that data, by assembling a portal state object for the current user and returning it to the client.

5. The system of claim 1 wherein each of a plurality of portlets has an individual webflow associated with the portlet.

6. A method for providing application flow integration in a portal framework, comprising the steps of:
   providing a portal that provides a central access point and common look-and-feel for users of the portal to applications running at the portal;
   representing the current state of the portal for a current user in a portal state object;
   determining whether an incoming servlet request represents a request either for a portal page or for a non-portal page; and,
   passing all portal page requests to a portal processor, and executing an appropriate webflow, including detecting a current set of events and the current state of the portal, to update the current state of the portal page, and a flow of application logic within the portal, depending on the current set of events.

7. The method of claim 6 wherein said portal processor includes a webflow executor for receiving portal page requests and handling said portal page requests at the portal processor.

8. The method of claim 6 further comprising the steps of:
   invoking webflow namespaces for the portal and any portlets to be rendered for the request; and, providing a URL to the portal servlet which is used to forward the request to an appropriate servlet or Java Server Page as determined by the webflow.

9. The method of claim 6 further comprising the step of: assembling a portal state object for the current user and returning it to the client to provide an interface between persisted portal data and the clients of that data.

10. The method of claim 6 wherein each of a plurality of portlets has an individual webflow associated with the portlet.

11. The method of claim 10 wherein each webflow is specified as a set of entries in a portlet webflow configuration file.

12. A system for providing application flow integration in a portal framework, comprising:
   a portal servlet which handles all incoming servlet requests and determines whether they represent a request for either a portal page or a non-portal page;
   a portal processor which handles all portal page requests, and for each request
      obtains the current portal state object for the request, which represents the current state of the portal for a current user,
      detects a current set of events and the current state of the portal,
      executes appropriate framework logic to adjust the current state depending on the current set of events, and to modify the flow of application logic within the portal,
      invokes webflow namespaces for the portal and all portlets to be rendered for the request, wherein the webflow namespaces declaratively cause execution of appropriate business logic for the given request, and,
      provides a URL to the portal servlet which is used to forward the request to the appropriate servlet or Java Server Page;
   a portal session which maintains the current portal page for the user and the content jsp page for each portlet; and,
   a portal manager which provides an interface between persisted portal data and the clients of that data, by assembling a portal state object for the current user and returning it to the client.

13. The system of claim 12 wherein each of a plurality of portlets has a webflow associated with it.

14. A method for providing application flow integration in a portal framework, comprising the steps of:
   handling all incoming servlet requests and determining whether they represent a request for either a portal page or a non-portal page;
   for each request
      obtaining the current portal state object for the request, wherein the current portal state object represents the current state of the portal for a current user,
      detecting a current set of events and the current state of the portal,
      executing appropriate framework logic to adjust the current state depending on the current set of events, and to modify the flow of application logic within the portal,
      invoking webflow namespaces for the portal and all portlets to be rendered for the request, wherein the webflow namespaces declaratively cause execution of appropriate business logic for the given request, and,
      providing a URL to the portal servlet which is used to forward the request to the appropriate servlet or Java Server Page;
   representing the current state of the portal for the current user;
   maintaining the current portal page for the user and the content jsp page for each portlet; and,
   providing an interface between persisted portal data and the clients of that data, by assembling a portal state object for the current user and returning it to the client.

15. The method of claim 14 wherein each of a plurality of portlets has a webflow associated with it.

16. The method of claim 15 wherein each webflow is specified as a set of entries in a configuration file.

* * * * *